United States Patent
Carrasco et al.

(10) Patent No.: US 10,719,340 B2
(45) Date of Patent: Jul. 21, 2020

(54) COMMAND BAR USER INTERFACE

(71) Applicant: Microsoft Technology Licensing, LLC, Redmond, WA (US)

(72) Inventors: Luis Carrasco, Redmond, WA (US); Darya Valchonak Kishylau, Redmond, WA (US); Methil Harysh Menon, Redmond, WA (US); Michael Hill, Redmond, WA (US); Paul Y Sim, Seattle, WA (US); Sharad Goel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/182,378

(22) Filed: Nov. 6, 2018

(65) Prior Publication Data
US 2020/0142723 A1    May 7, 2020

(51) Int. Cl.
| G06F 3/00 | (2006.01) |
| G06F 9/44 | (2018.01) |
| G06F 9/46 | (2006.01) |
| G06F 13/00 | (2006.01) |
| G06F 9/455 | (2018.01) |
| G06F 9/451 | (2018.01) |
| G06F 16/242 | (2019.01) |

(52) U.S. Cl.
CPC .......... *G06F 9/45512* (2013.01); *G06F 9/451* (2018.02); *G06F 16/2428* (2019.01)

(58) Field of Classification Search
CPC .................................................. G06F 9/45512
USPC ........................................................ 719/320
See application file for complete search history.

(56) References Cited

U.S. PATENT DOCUMENTS

| 5,157,763 | A | 10/1992 | Peters et al. |
| 5,617,527 | A | 4/1997 | Kressin et al. |
| 5,745,717 | A | 4/1998 | Vayda et al. |
| 6,058,304 | A | 5/2000 | Callaghan et al. |
| 6,098,054 | A | 8/2000 | McCollom et al. |
| 6,216,139 | B1 | 4/2001 | Listou |
| 6,449,624 | B1 | 9/2002 | Hammack et al. |
| 6,600,498 | B1 | 7/2003 | Chow |
| 6,724,408 | B1 | 4/2004 | Chen et al. |

(Continued)

FOREIGN PATENT DOCUMENTS

EP    2479647 A1    7/2012

OTHER PUBLICATIONS

"Introduction to C Programming", Retrieved from https://www.le.ac.uk/users/rjm1/cotter/page_78.htm, Retrieved Date: Aug. 27, 2018, 3 Pages.

(Continued)

*Primary Examiner* — Timothy A Mudrick
(74) *Attorney, Agent, or Firm* — Schwegman Lundberg & Woessner, P.A.

(57) ABSTRACT

Disclosed in some examples, are methods, systems, GUIs, and machine-readable mediums for providing an improved command bar interface that assists a user in entering commands by implementing a scope operator to specify a command scope and also visual controls for entering parameters of commands. The command bar may have a default global scope that may be modified by users by entering a scope operator and a scope identifier. The command bar may render a set of parameter segments to assist users in entering parameters for the commands.

20 Claims, 17 Drawing Sheets

(56) References Cited

U.S. PATENT DOCUMENTS

| | | |
|---|---|---|
| 7,512,899 B1 | 3/2009 | Hoiem et al. |
| 7,543,248 B2 | 6/2009 | Denoue et al. |
| 7,624,401 B2 | 11/2009 | Snover et al. |
| 7,895,530 B2 | 2/2011 | Leavitt et al. |
| 7,926,038 B2 | 4/2011 | Rossi et al. |
| 7,941,762 B1 * | 5/2011 | Tovino .................. H04L 51/046 379/201.01 |
| 8,296,670 B2 | 10/2012 | Matthews et al. |
| 8,554,755 B2 | 10/2013 | Richardson et al. |
| 8,588,378 B2 | 11/2013 | Davies et al. |
| 8,725,743 B2 | 5/2014 | Grieves et al. |
| 8,838,858 B1 | 9/2014 | Wu et al. |
| 8,843,841 B2 | 9/2014 | Cataldo et al. |
| 8,954,869 B2 | 2/2015 | Courteaux |
| 9,032,329 B2 | 5/2015 | Sadouski |
| 9,081,761 B1 | 7/2015 | Little et al. |
| 9,459,765 B2 | 10/2016 | Carapella et al. |
| 9,558,445 B1 | 1/2017 | Rabe et al. |
| 9,722,879 B1 | 8/2017 | Muthu |
| 10,002,164 B2 | 6/2018 | Jarvis et al. |
| 10,417,331 B2 | 9/2019 | Singh et al. |
| 2001/0052030 A1 | 12/2001 | Shiraishi |
| 2002/0107746 A1 | 8/2002 | Jacoby, Jr. |
| 2003/0078949 A1 | 4/2003 | Scholz et al. |
| 2003/0126195 A1 | 7/2003 | Reynolds et al. |
| 2003/0163570 A1 | 8/2003 | Hendley et al. |
| 2004/0024615 A1 | 2/2004 | Monteleone et al. |
| 2005/0060693 A1 | 3/2005 | Robison et al. |
| 2005/0182773 A1 | 8/2005 | Feinsmith |
| 2006/0041545 A1 * | 2/2006 | Heidloff .............. G06F 16/3323 |
| 2006/0190579 A1 | 8/2006 | Rachniowski et al. |
| 2006/0259479 A1 | 11/2006 | Dai |
| 2006/0271910 A1 | 11/2006 | Burcham et al. |
| 2007/0038538 A1 | 2/2007 | Silverbrook et al. |
| 2008/0155565 A1 | 6/2008 | Poduri |
| 2009/0172035 A1 | 7/2009 | Lessing et al. |
| 2009/0172541 A1 | 7/2009 | Acedo et al. |
| 2009/0248902 A1 | 10/2009 | Blue |
| 2010/0017720 A1 | 1/2010 | Anderson |
| 2010/0191520 A1 | 7/2010 | Gruhn et al. |
| 2010/0223562 A1 | 9/2010 | Carapella et al. |
| 2010/0281412 A1 | 11/2010 | Cataldo et al. |
| 2011/0307484 A1 | 12/2011 | Anand |
| 2012/0047458 A1 | 2/2012 | Alberry et al. |
| 2012/0144318 A1 * | 6/2012 | Khadilkar .............. H04L 51/20 715/753 |
| 2012/0192096 A1 * | 7/2012 | Bowman .............. G06F 3/0481 715/780 |
| 2013/0080514 A1 * | 3/2013 | Gupta ................. G06F 9/45512 709/203 |
| 2013/0087628 A1 | 4/2013 | Nelson et al. |
| 2013/0263043 A1 | 10/2013 | Sarbin |
| 2013/0268446 A1 | 10/2013 | Buschmann et al. |
| 2014/0040741 A1 | 2/2014 | van os et al. |
| 2015/0067640 A1 | 3/2015 | Booker et al. |
| 2015/0082218 A1 | 3/2015 | Affoneh et al. |
| 2015/0172117 A1 | 6/2015 | Dolinsky et al. |
| 2015/0178371 A1 | 6/2015 | Seth et al. |
| 2015/0242474 A1 | 8/2015 | Mikalsen et al. |
| 2015/0319203 A1 | 11/2015 | Jeremias |
| 2015/0324300 A1 | 11/2015 | Sampathkumar et al. |
| 2016/0132119 A1 | 5/2016 | Temple |
| 2016/0342665 A1 | 11/2016 | Lane et al. |
| 2017/0154125 A1 * | 6/2017 | Balakrishnan ...... G06F 3/04842 |
| 2018/0338914 A1 | 11/2018 | Inhaber et al. |
| 2019/0004821 A1 | 1/2019 | Uppal et al. |
| 2019/0102218 A1 * | 4/2019 | Denise .................. G06F 9/4843 |

OTHER PUBLICATIONS

"Slash Commands", Retrieved from https://api.slack.com/slash-commands, Retrieved Date: Aug. 27, 2018, 15 Pages.

"Bots: An Introduction for Developers", Retrieved From: https://web.archive.org/web/20170514075033/https://core.telegram.org/bots, Retrieved on: May 22, 2017, 13 Pages.

"Command-line Completion", Retrieved from: https://web.archive.org/web/20160409101238/https://en.wikipedia.org/wiki/Command-line_completion, Apr. 9, 2016, 5 Pages.

"Inline Bots", Retrieved From: https://web.archive.org/web/20170715131244/https://core.telegram.org/bots/inline, Retrieved on: May 22, 2017, 4 pages.

"React Bootstrap Autosuggest", Retrieved from: https://affinipay.github.io/react-bootstrap-autosuggest/, Retrieved on: May 22, 2017, 8 Pages.

"Final Office Action Issued in U.S. Appl. No. 15/638,318", dated Jan. 10, 2020, 23 Pages.

"Final Office Action Issued in U.S. Appl. No. 15/638,318", dated Apr. 4, 2019, 28 Pages.

"Non Final Office Action Issued in U.S. Appl. No. 15/638,318", dated Nov. 20, 2018, 25 Pages.

"Non Final Office Action Issued in U.S. Appl. No. 15/638,318", dated Sep. 4, 2019, 32 Pages.

"Non Final Office Action Issued in U.S. Appl. No. 16/182,359", dated Dec. 23, 2019, 23 Pages.

Ellingwood, Justin, "An Introduction to Useful Bash Aliases and Functions", Retrieved from: https://www.digitalocean.com/community/tutorials/an-introduction-to-useful-bash-aliases-and-functions, Mar. 21, 2014, 12 Pages.

Higgins, Krystal, "Inline Hints Design Pattern", Retrieved from: https://web.archive.org/web/20160502022533/http:/ui-patterns.com/patterns/inline-hints, May 2, 2016, 3 Pages.

"International Search Report and Written Opinion Issued in PCT Application No. PCT/US2018/034792", dated Aug. 14, 2018, 14 Pages.

* cited by examiner

| | | 305 307 310 | |
|---|---|---|---|
| ACTIVITY | CHAT RECENTS | /CHAT CHAT WITH A FELLOW COLLEAGUE | |
| CHAT | PINNED | /CALL CALL SOMEONE | UR ADIPISCING ELIT |
| TEAMS | JEFF JONES LOREM IPSUM DOLO | /HELP GET HELP | OREM IPSUM DOLOR |
| MEETINGS | BETH SMITH LOREM IPSUM DOLO | /ACTIVITY SEE SOMEONE'S ACTIVITY | T, CONSECTETUR |
| CALLS | DAVID SUMNERS LOREM IPSUM DOLO | /DND DO NOT DISTURB | |
| FILES | RECENT | /CREATE (@PLANNER) CREATE A TASK FOR SOMEONE | |
| | JEFF SANDERS LOREM IPSUM DOLOR... | /AVAILABLE SET YOUR STATUS TO AVAILABLE | |
| STORE | MEGAN SMITH LOREM IPSUM DOLOR... | /AWAY SET YOUR STATUS TO AVAILABLE | 2:00 PM LETS GET TOGETHER FOR LUNCH |
| FEEDBACK | SARAH JONES LOREM IPSUM DOLOR... | | |
| | PAT JOHNSON LOREM IPSUM DOLOR... | TYPE A NEW MESSAGE | |

COMMAND BAR USER INTERFACE

BACKGROUND

Graphical User Interfaces (GUI)s have revolutionized the computing industry by providing visually appealing and easy to use interfaces to various applications. Traditional GUI design eschews the use of text-based interfaces such as command lines in favor of menus and buttons. Limited screen real-estate along with the use of visually appealing graphic icons means that screen real-estate for buttons and other controls are reserved for the most commonly used functions. Other functions are embedded in menus and other dialogs.

Accessing functions in menus and dialogs can be tedious for users. First, a user must find where the function resides within a maze of menus. Repeating this step multiple times can be time consuming over the course of a day. To enable quick use of various functions, applications often have short cut keys. Short cut keys are key combinations that allow for quickly executing a function or changing a setting. For example, pressing the control key and the 'b' key at the same time may change a font to bold in a word processing application. These keys quickly enable fast selection of functions in the application, however, users find it difficult to remember the various key combinations and their functions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 illustrates a GUI of a collaboration application according to some examples of the present disclosure.

FIG. 2 illustrates a GUI of a collaboration application in response to the entry of a scope operator in command bar according to some examples of the present disclosure.

FIG. 3 illustrates a GUI of a collaboration application in response to the entry of a command operator according to some examples of the present disclosure.

FIG. 5 illustrates a GUI of a collaboration application in response to the entry of a command according to some examples of the present disclosure.

FIG. 6 illustrates a GUI of a collaboration application in response to the entry of a command and a selection of a parameter segment according to some examples of the present disclosure.

FIG. 7-10 illustrate GUIs of a collaboration application in response to the entry of a command according to some examples of the present disclosure.

DETAILED DESCRIPTION

Figure 4:
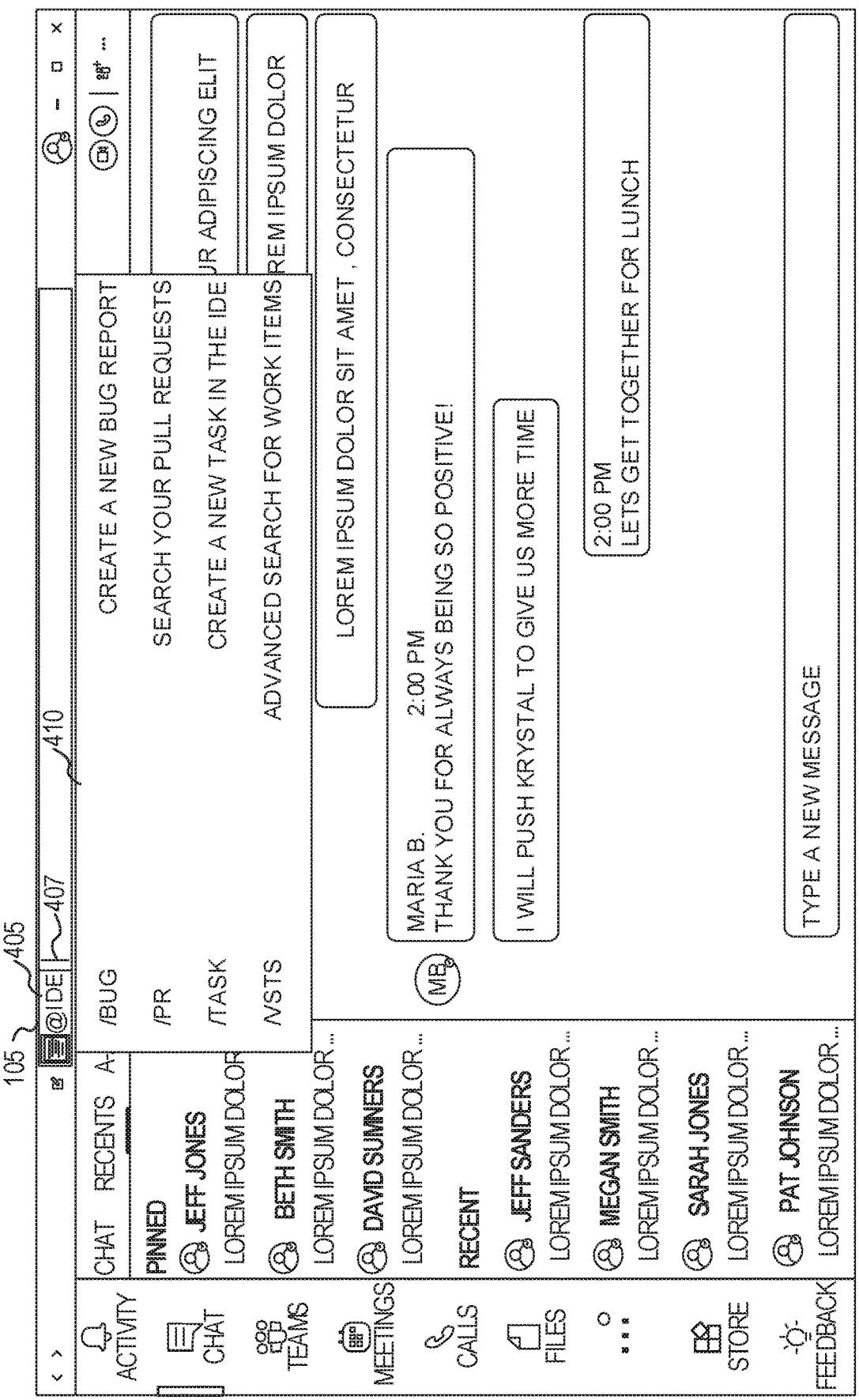
FIG. 4 illustrates a GUI of a collaboration application in response to the entry of a command scope operator and a command scope identifier according to some examples of the present disclosure.

Command bars which are implemented as text boxes in a GUI allow for freeform command execution using free-form text input. Typically, the default command executed by the command bar is a search using the entered text as a search string. However, by preceding the text with a command operator (e.g., a '/') the command may be changed from the default command (e.g., a search) to the command identified by the text entered by the user. To assist users in remembering the command names, command bars will often provide autocompletion suggestions in a box below the command bar.

Command bars thus offer an efficient way of entering and executing commands. Still, command bars are often limited in functionality as a command may have many parameters that are in a particular order that are difficult to remember. Furthermore, command bars may allow for commands that may be applicable to a number of scopes but may not offer a way to select a desired scope to apply the command to. For example, users don't have a way to specify that they are only interested in a particular command applying to a particular user, application, data set, or other target.

Disclosed in some examples, are methods, systems, GUIs, and machine-readable mediums for providing an improved command bar interface that assists a user in entering commands by implementing a scope operator to specify a command scope and also visual controls for entering parameters of commands. The command bar may have a default global scope that may be modified by users by entering a scope operator and a scope identifier. Command scopes specify a target of a command. Example command scopes may include applications (e.g., the application that is to execute the command), data items (e.g., files, pictures, documents), users, and the like. For example, the command bar may have a global scope as a default, but by typing "@files" the scope is restricted to files. A search command scoped by "files" may search only files of a user and not other content of the user such as messages.

Additionally, the current scope may specify a plurality of allowed commands from a list of globally available commands. The available commands for a given scope may be specified by a stored command-scope hierarchy. For example, a calendar application command scope may have various calendar commands associated such as creating an appointment, adding a task, cancelling an appointment, creating a meeting, and the like. In some examples, different applications may have a same command—for example, in addition to the calendar application, an integrated development environment may allow for the creation of tasks using a same command. The scope operator may allow for specifying which application the user is targeting. This may allow for non-global command namespaces and lead to better descriptive naming of commands to assist the user in finding the command.

In addition to command scoping, the GUI of the command bar dynamically changes based upon text entered by the user as they type. For example, in response to detecting text identifying a particular command, the command bar may provide a set of visually delineated and selectable parameter input segments inside the command bar—each of the segments corresponding to a different one of the set of parameters corresponding to the command. Users may then complete each parameter by clicking on the text input sections and entering the parameter. The command is then executed using these parameters. In some examples, if the command bar is not large enough to fit all the parameters and parameter values, the command bar may scroll, or the segments may expand when the user is typing (to show the entire command value) and contract when another segment is selected (not showing some of the entered command value).

The improved command bar thus represents an improvement to the functionality of a computer system interface as the improved command bar makes it easier for a user to quickly and easily access commands and functions of the applications of the computing device. Users may easily specify a particular scope of execution of a command to access data and execute commands targeted to the specific data, users, or applications they are interested in. Furthermore, the particular scope selects applicable commands that are valid for the selected scope. This allows for more than one scope (e.g., application) to utilize a particular command name (expanding the number of command names available) and thus allows for more accurate command names. Furthermore, by having similar commands share names across different applications, the system may be easier to use as users only need to remember the same name for similar tasks rather than convoluted command names that would otherwise be necessary with a global scope (to avoid name collisions).

Moreover, users may forgo memorizing parameters of commands and their ordering. Instead, users simply type the command, select a parameter input segment for the parameters (which may be labeled with the parameter name, the type of data expected, and the like) and enter the parameter.

Figure 1:
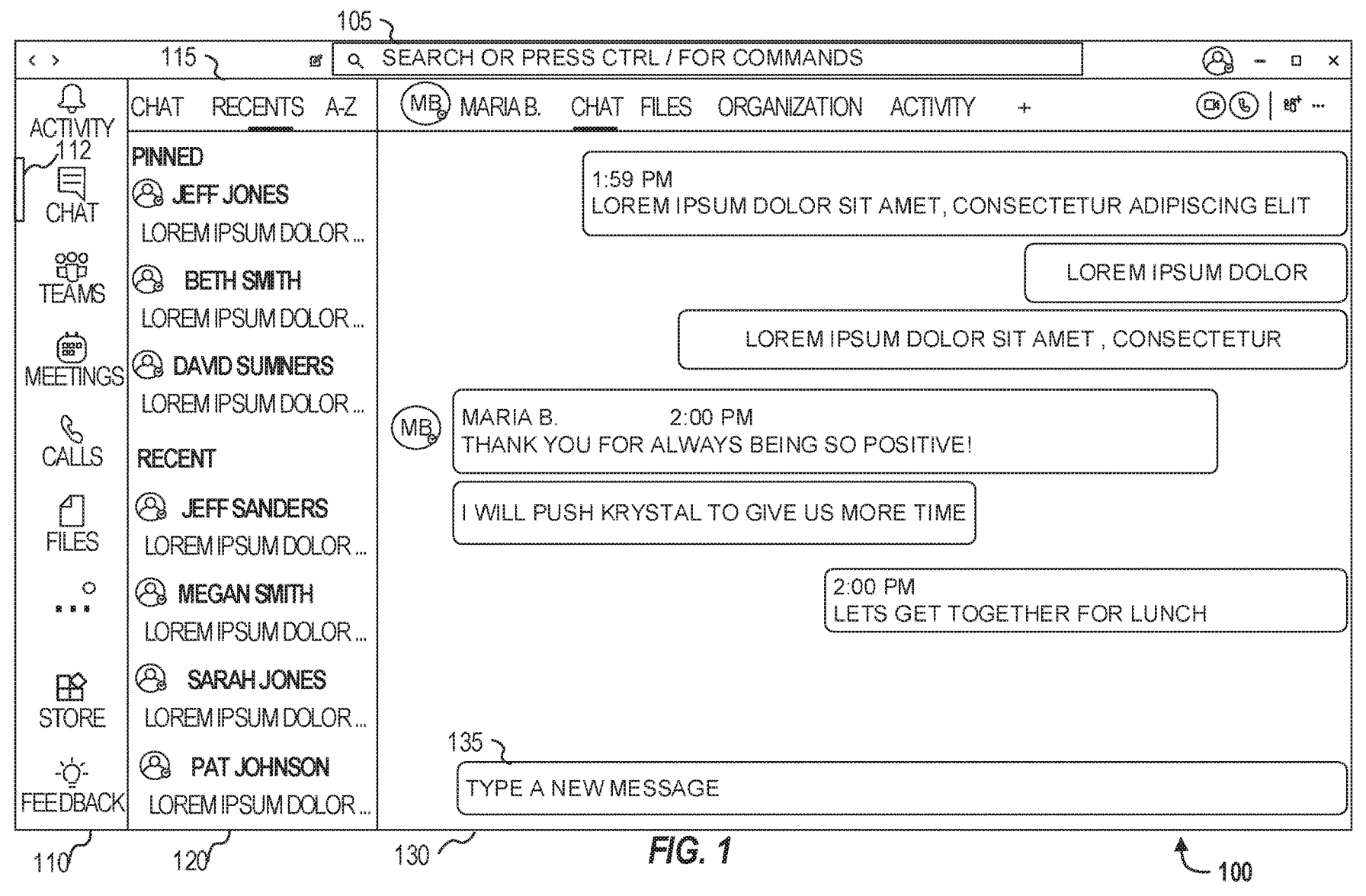

FIG. 1 illustrates a GUI 100 of a collaboration application according to some examples of the present disclosure. Command bar 105 allows for entering commands and/or searching as will be further explained herein. Function tab selector panel 110 allows users to select between various functions of the collaboration application, such as seeing recent activity, chatting with users, team collaboration ("teams"), a planner application ("meetings"), a voice over IP functionality ("calls"), a list of files of the user ("files"), an indication of additional tabs (" . . . "), a store where users can install additional functionality, and a button to submit feedback. Chat is currently selected based upon the indicator 112. Users may select a different function by clicking on or selecting one of the other functions in the function tab selector panel 110.

Chat selector panel 115 controls the chats displayed in panel 120 between chats of interest (in this case, recent and pinned chats) and a contact selector list ("A-Z"). Chat window 130 shows chats from the most recently selected contact from the chat selector panel 115 (currently "Maria B."). Different chats may be selected by changing the contact through the chat selector panel 115 by selecting the contact selector list and then selecting a different contact. Message box 135 allows users to type new chat messages for the displayed chat into the text box. These messages are sent to the currently open chat. Command bar 105 may allow for the execution of commands and setting the scopes of those commands as will be demonstrated.

Figure 2:
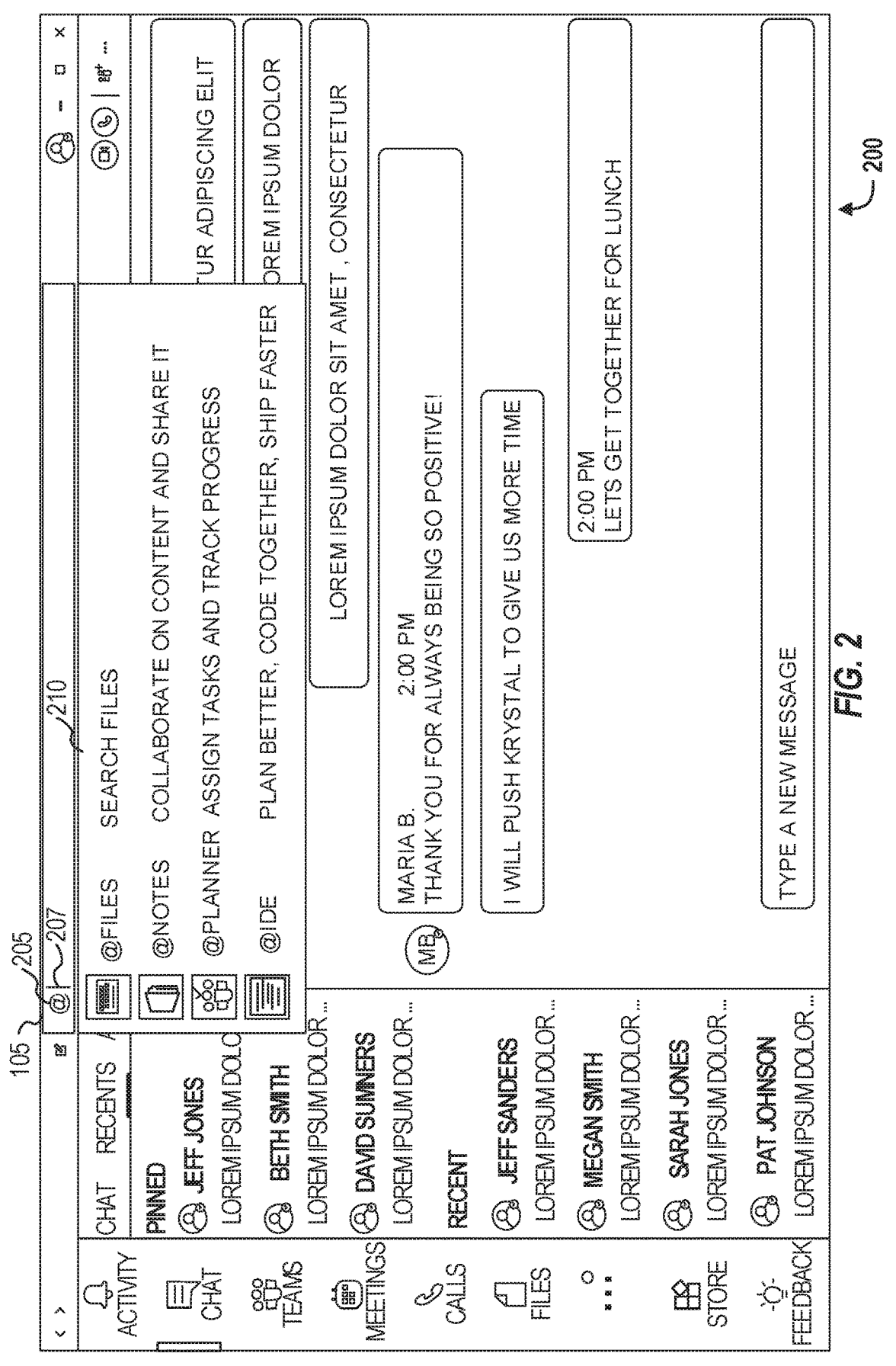

FIGS. 2-10 show various functionalities of the command bar 105, but otherwise feature the same elements of GUI 100 as shown in FIG. 1. FIG. 2 illustrates a GUI 200 of a collaboration application in response to the entry of a scope operator 205 in command bar 105 ('@' in this example) according to some examples of the present disclosure. The command scope operator may be one or more characters that specify that one or more predetermined printed speech units (e.g., words, phrases, sentences) following the operator identify a selected command scope. The text cursor 207 is active right behind the scope operator 205.

The system may provide predicted command scope identifiers in a predictive guess box 210. The predicted command scope identifiers may be based upon recently used identifiers, predicted identifiers based upon one or more features such as a user context (including a user task), and the like. In some examples, where the set of possible command scope identifiers is less than or equal to the amount of space of the predictive guess box, all the set of command scope identifiers may be included. The command scope identifiers may be ordered based upon a likelihood of selection by the user such that a options with higher likelihoods of selection are listed before options with lower likelihoods of selection. For example, if the system determines the user is more likely to select command scope operator option 'A' than option 'B'—option 'A' may be listed before option 'B'. In the example of FIG. 2, the system shows "Files" for commands relating to files, "Notes" for commands related to notes, "Planner" for commands relating to a calendar application, and an "IDE" for commands related to an integrated development environment (e.g., Virtual Studio® or other software development environment).

Predictions shown by the predictive text box may change as the user types characters into the text box. For example, the available scope identifiers are filtered based upon text the user has entered and then sorted based upon their likelihood of intent that the user selects that scope identifier. Thus, in the example of FIG. 2 if the user types "@I" the prediction box may hide non-matching commands (e.g., show only the "@IDE" scope).

FIG. 3 shows a GUI 300 of a collaboration application in response to the entry of a command operator ('/' in this example) according to some examples of the present disclosure. The command operator 305 '/' entered into the command bar 105 indicates that one or more predetermined printed speech units (e.g., words, phrases, sentences) following the operator specifies a command name. The text cursor 307 indicates the user just entered the operator. In the example of FIG. 3, the scope is a default scope (as the user has not entered a scope operator with a scope identifier). One default scope is a global scope. A global scope is a highest-level scope and encompasses all commands in all scopes. Had the user entered a scope identifier, the list of commands in the predictive text box 310 would be limited to those commands corresponding to the entered scope. Instead, since the scope is global, all the commands are listed. If two commands have the same name and the scope is global, they may be distinguished using a graphic or other icon next to their name that specifies the applicable scope.

The system provides predicted command names in a predictive text box 310. The predicted command names may be based upon recently used commands, predicted commands based upon a user context (including a user task), and the like. In some examples, where the set of possible command names is less than or equal to the amount of space of the predictive guess box, all the set of command scope operators may be included. The command names may be ordered based upon a likelihood of selection by the user such that a options with higher likelihoods of selection are listed before options with lower likelihoods of selection (e.g., if the system determines the user is more likely to select command name 'A' than name 'B'—name 'A' may be listed before option 'B').

In the example of FIG. 3, the system shows a chat command for allowing a user to chat with another user, a call command for allowing users to call someone, a help command for allowing users to get help, an activity command for seeing someone's activity, a do not disturb "dnd" command for setting a do not disturb status, a create a task command, a command for indicating an available status, a command for indicating that the user is away. In some examples, such as with respect to the create a task command, there may be multiple commands that correspond to the create a task command—e.g., a task for a calendar and a task for a IDE. In the examples in which multiple commands may correspond to different scopes, the task may have a command scope indicated in the predictive text box 310 (e.g., either textually or by use of an icon).

Predictions shown by the predictive text box 310 may change as the user types characters into the text box. For example, the available commands are filtered based upon text the user has entered and then sorted based upon their likelihood of intent that the user selects that command. Thus, in the example of FIG. 3 if the user types "/c" the prediction box may hide non-matching commands (e.g., show only the "/chat" and "/call" commands).

FIG. 4 shows a GUI 400 of a collaboration application in response to the entry of a command scope operator and a command scope identifier according to some examples of the present disclosure. In the example of GUI 400, the user previously entered a command scope with identifier 405 "@IDE" into the command bar. The command bar 105 may change (as shown in the figure) to indicate that commands are scoped by the "IDE" scope. For example, an icon and the current scope may be displayed in a segment of the command bar. The cursor is shown 407 ready to enter a command. Predictive text box 410 shows predicted searches and/or commands corresponding to the IDE scope. For example, users may submit a bug by typing "/bug", search pull requests by typing "/pr", create a task by typing "/task", advanced searching for work items by typing "/vsts".

Predictions shown by the predictive text box 410 may change as the user types characters into the text box. For example, the available commands are filtered upon the scope identifier, but also based upon text the user has entered and then sorted based upon their likelihood of intent that the user selects that command. Thus, in the example of FIG. 4 if the user types "/b" the prediction box may hide non-matching commands (e.g., show only the "/bug" command).

Figure 5:
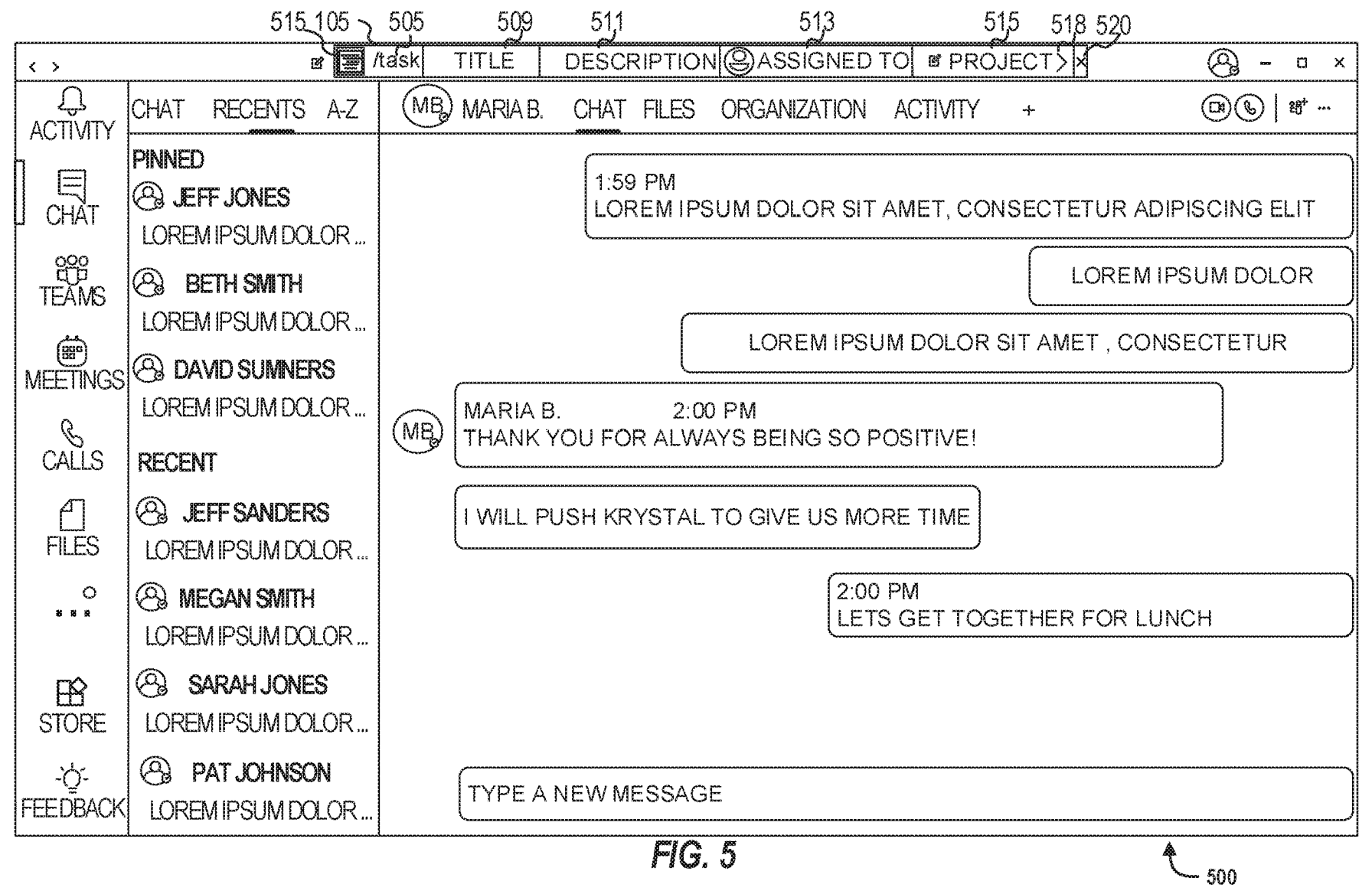

FIG. 5 shows a GUI 500 of a collaboration application in response to the entry of a command according to some examples of the present disclosure. The user has entered a command operator and a command identifier "/task" into the command bar 105. The command bar 105 indicates the command scope as an IDE scope by the graphic icon 515. The command bar also includes an execute control 518 (shown as a right facing caret) that when selected, causes the command to be executed with the current set of values entered into the parameters. In some examples, the caret may be grayed out unless required parameter values (as indicated by the command hierarchy) are filled in with legal values.

Additionally, a cancel control 520 is displayed, that when selected, cancels the command returns the command bar to its default state. The command is indicated in segment 505 of the command bar 105, and each parameter for the task command is shown in a visually delineated and selectable parameter segment inside the command bar. For example, the command bar 105 is divided into a plurality of segments, each segment comprising a text box that corresponds to a different parameter of the current command.

As shown in FIG. 5, a task title segment 509, a task description segment 511, a person selector segment 513 (that assigns the task to that person), and a project segment 515. Users may click on each of these boxes and enter in the parameter. In some examples, each segment includes information on the parameter. For example, the name of the parameters, a type of data expected, and the like. The segments may be visually represented as sections of the command bar, or may be visually represented as "pills" with round borders within the command bar.

Figure 6:
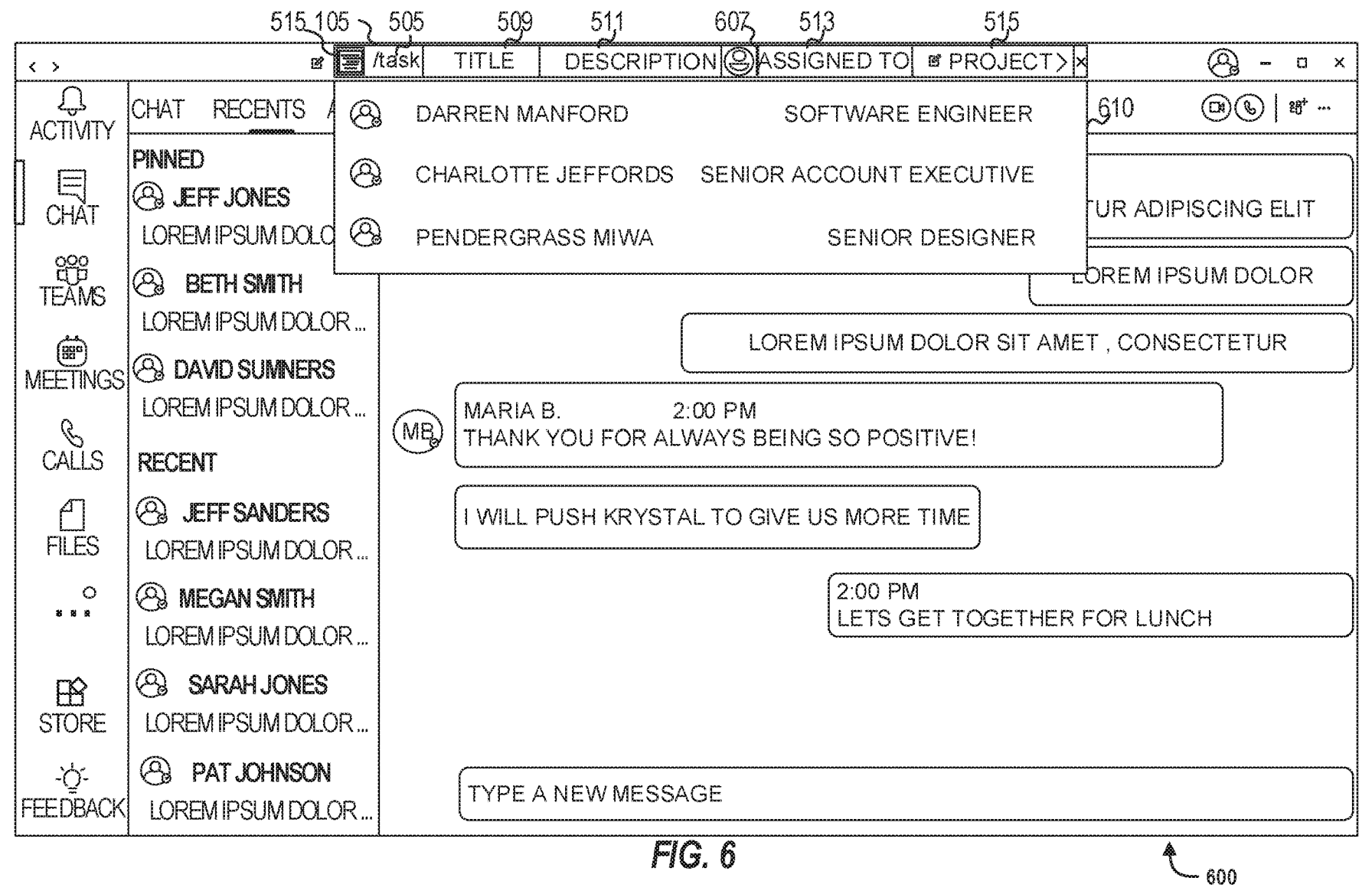

FIG. 6 illustrates a GUI 600 of a collaboration application in response to the entry of a command and a selection of a parameter segment according to some examples of the present disclosure. FIG. 6 is a continuation of the workflow of FIG. 5. In FIG. 6, the user has clicked on the "assigned to" parameter segment as indicated by the placement of the cursor 607 in this segment. The predictive text box 610 shows predicted values for the currently selected parameter. In this case, predictive text box 610 shows predictions for whom the task should be assigned to. Parameter predictions are based upon recently used parameters, user contexts, people the user recently associated with, files the user recently accessed, and the like. The parameter predictions utilizes parameter type information in the command hierarchy to determine what types of data matches those parameters. In the case of FIG. 6, the parameter type may indicate that the parameter value is a person and that people should be shown in the predictive text box 610.

Predictions shown by the predictive text box 610 may change as the user types characters into the text box. For example, the available parameter values are filtered based upon text the user has entered and then sorted based upon their likelihood of intent that the user selects that value. Thus, in the example of FIG. 6 if the user types "d" the prediction box may hide non-matching commands (e.g., show only the "Darren Manford" parameter value that identifies a user). As previously discussed, the parameter type is also a filter that limits the values that are displayed.

Figure 7:
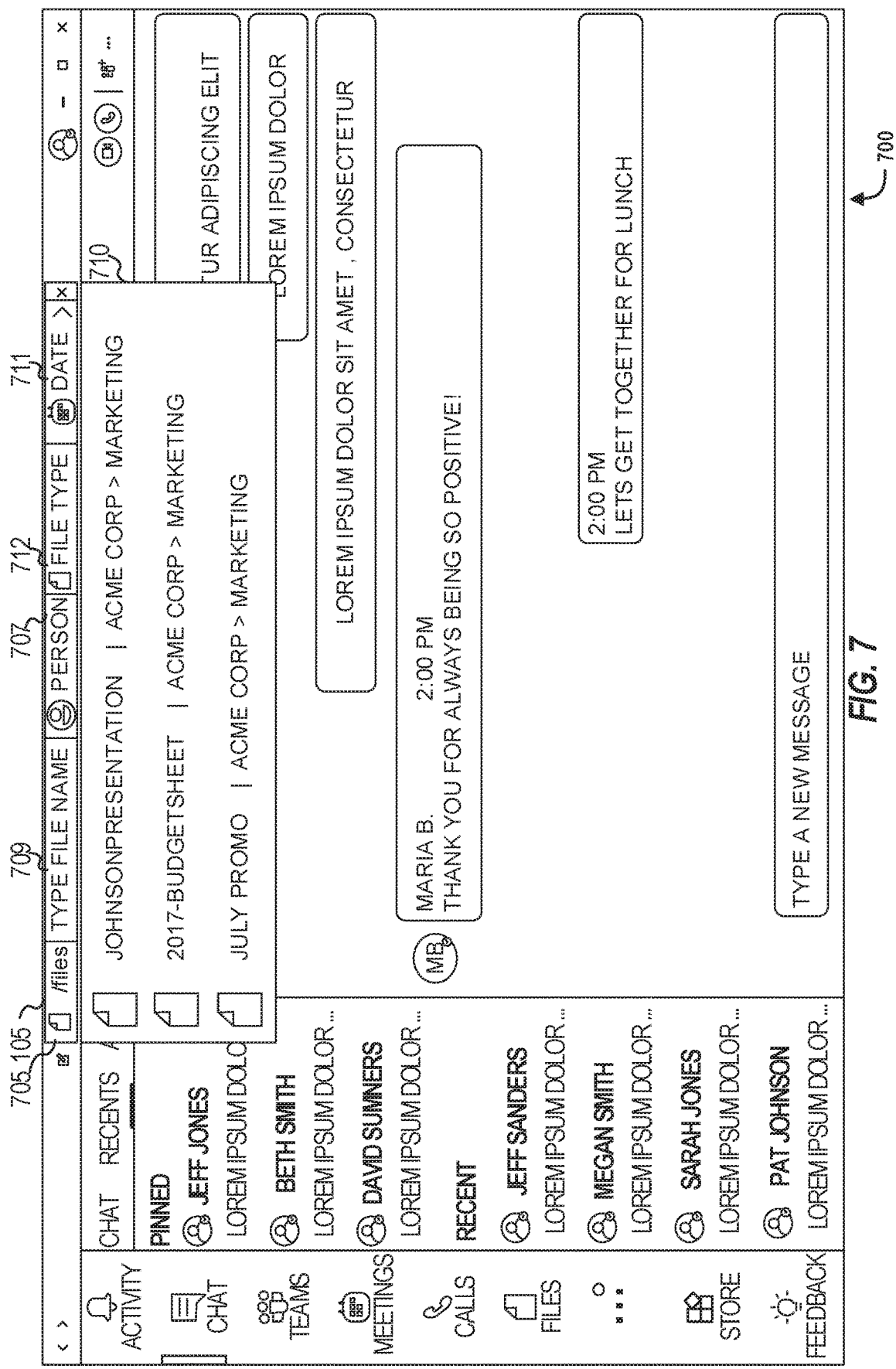

In some examples, some scope identifiers may also be overloaded as commands. FIG. 7 illustrates a GUI 700 of a collaboration application in response to the entry of a command according to some examples of the present disclosure. FIG. 7 shows an example of a file search command "/files" according to some examples of the present disclosure. In the example of FIG. 7, the search command "/files" includes an implicit command scope of "@files" and is a command to search the user's files. The command bar 105 indicates the command identifier in box 705. Each parameter for the file search command is shown in a visually delineated and selectable parameter segment (e.g., a text input control) inside the command bar.

For example, the command bar 105 is divided into a plurality of segments, each comprising a text box that corresponds to a different parameter of the current command. As shown in FIG. 7, a file name segment 709, a person segment 707 (which allows for a searcher to specify people that have created, modified, or are otherwise associated with the file), a file type segment 712, and a date segment 711 (e.g., for specifying creation, modification, or other dates corresponding to the file). Users may click on each of these boxes and enter in a value for the parameter. In FIG. 7 the user has not selected any of these boxes yet. The predictive text box 710 shows predicted files that the user is likely to want. File predictions are based upon recently used files, user contexts, files the user recently associated with, files the user recently accessed, files recently accessed by people the user is associated with, files recently accessed by groups the user is associated with, and the like. As with before, predictions shown by the predictive text box 710 may change as the user types characters into the text box. For example, the available parameter values are filtered based upon text the user has entered and then sorted based upon their likelihood of intent that the user selects that value.

Figure 8:
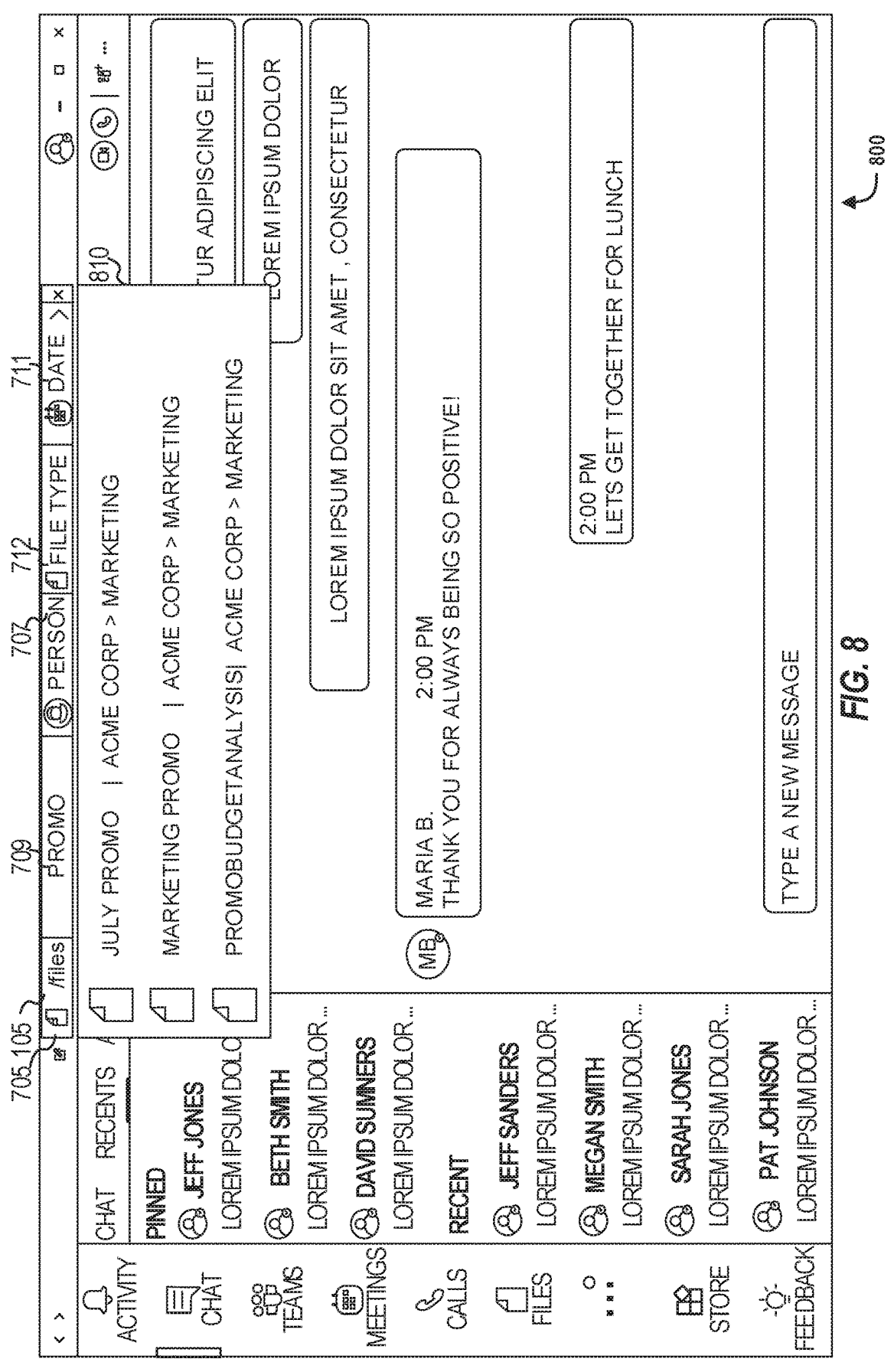

FIG. 8 illustrates a GUI 800 of a collaboration application in response to the entry of a command according to some examples of the present disclosure. In FIG. 8, the user has entered "promo" into the file name segment 709. The file predictions 810 have been updated to show file names containing "promo." The file predictions 810 may be sorted based upon the likelihood that the user is interested in the file.

Figure 9:
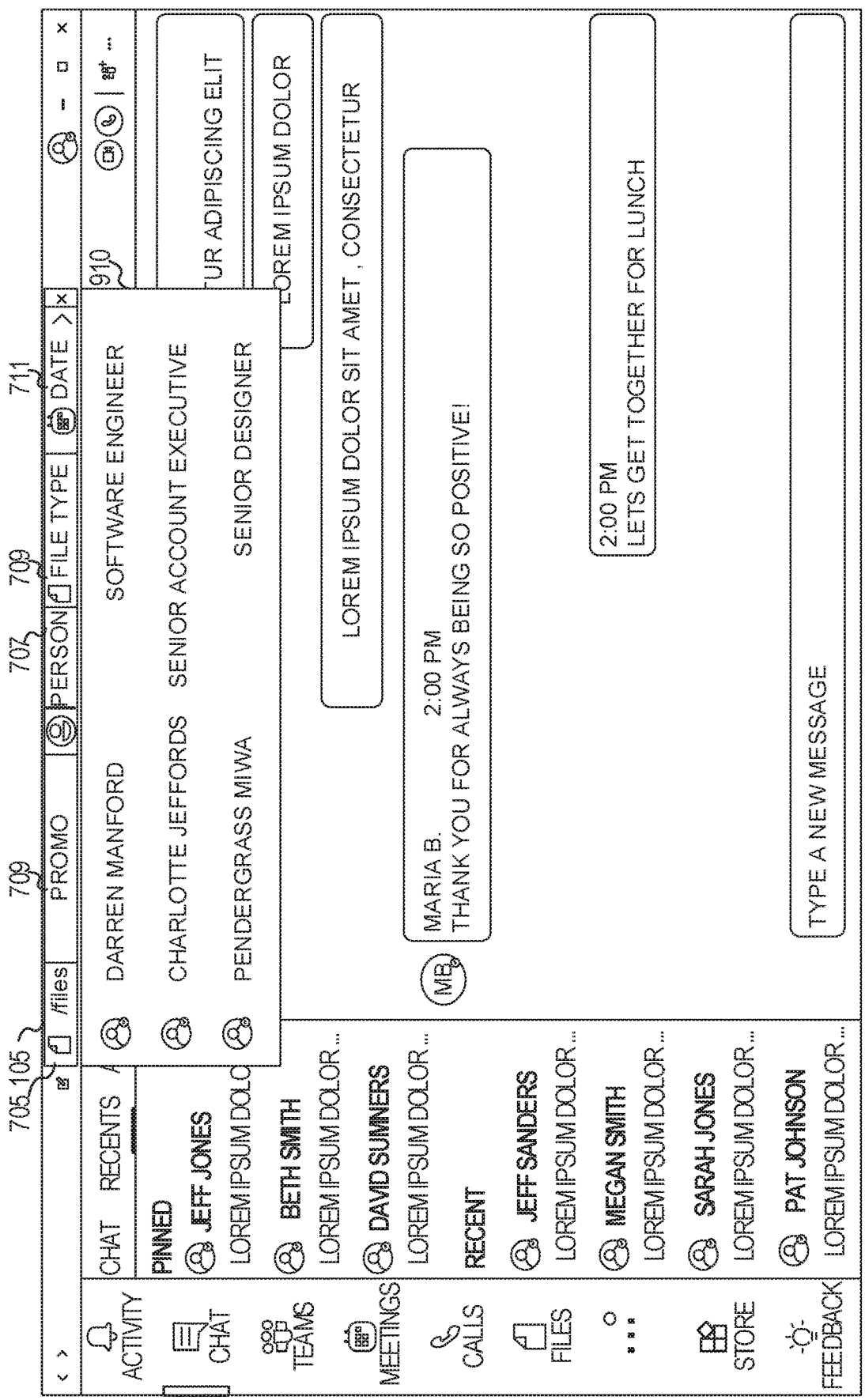

FIG. 9 illustrates a GUI 900 of a collaboration application in response to the entry of a command according to some examples of the present disclosure. In FIG. 9, the user has entered "promo" into the file name segment 709 and then selected the person segment 707. The predictions box has been updated 910 to show persons relevant to files that have promo in the title. In some examples, the persons shown are also relevant to the user searching for the files. For example, users within a same organization, team, project, or the like.

Figure 10:
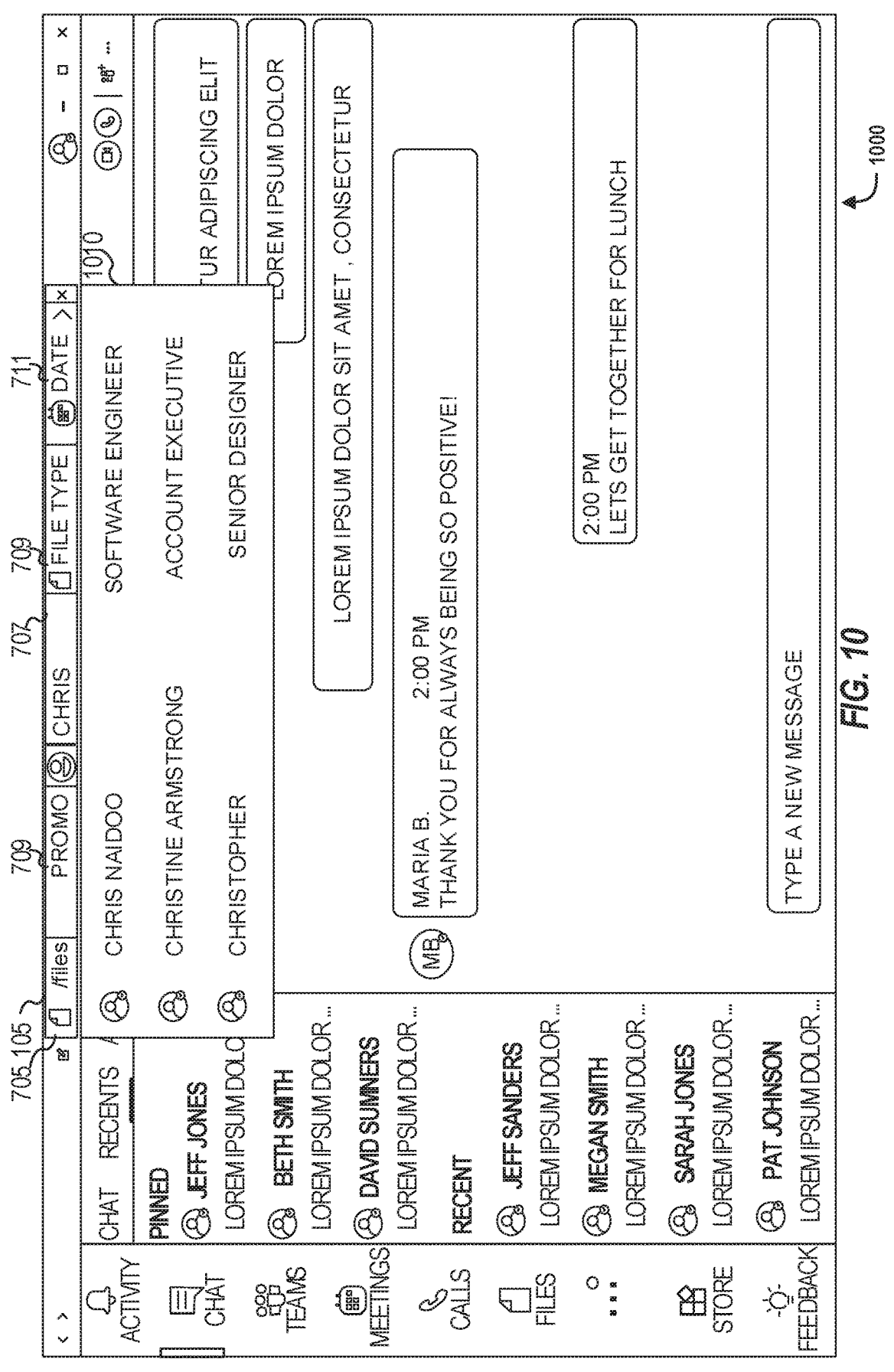

FIG. 10 illustrates a GUI 1000 of a collaboration application in response to the entry of a command according to some examples of the present disclosure. In FIG. 10, the user has entered "promo" into the file name segment 709 and then selected the person segment 707 and entered "Chris." The predictions box 1010 have been updated to show persons relevant to files that have promo in the title and "Chris" as a partial match. In some examples, the persons shown are also relevant to the user searching for the files. For example, users within a same organization, team, project, or the like. Although not shown, other filters such as file type and date may also present suggestions in predictions box 1010 based upon file types of matching files that match other entered parameters and that are relevant to the user. Thus, the predictions box 1010 dynamically responds with updated suggestions as the user enters in filters and parameters.

As previously noted, the predictions boxes attempt to predict what the user is looking for. These predictions may be based upon features such as a context of the user, information entered into the command bar, contexts of other users related to the user (e.g., files users in a same group as the user recently used), and the like. A context of the user may be a position of the user in an organization; data the user typically accesses and the similarities of that data to partial matches; contacts of the user; data the user has recently accessed; communications of the user including persons communicated with, content of the communications, times of the communications, and methods of communications; and the like. Matching entities may be given a context score that measures a context of the matching entity to the user based upon the above factors. The context score may be determined based upon a machine learning algorithm.

Figure 11:
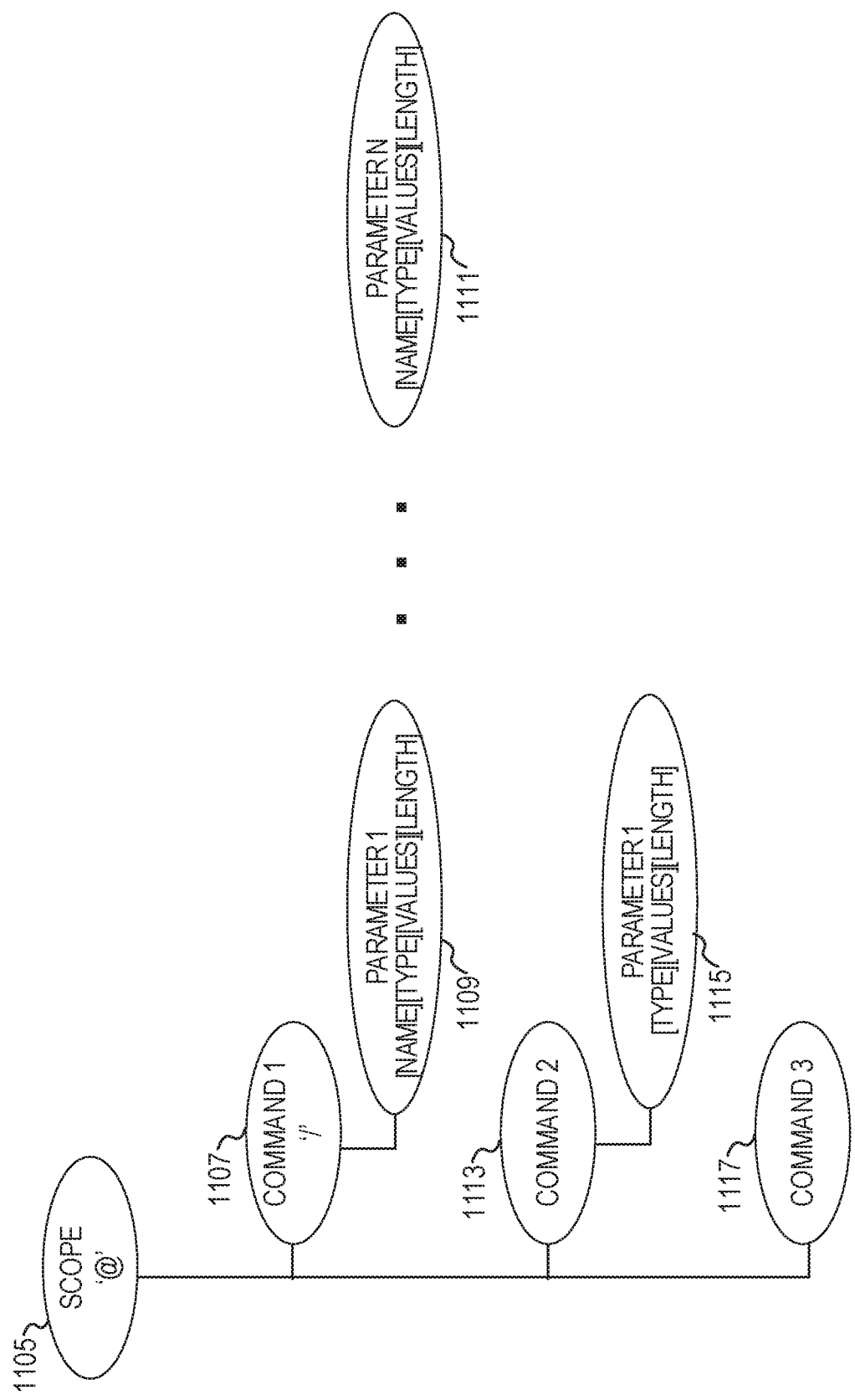
FIG. 11 illustrates an example schematic diagram of a portion of a command hierarchy according to some examples of the present disclosure.

FIG. 11 illustrates an example schematic diagram of a portion of a command hierarchy according to some examples of the present disclosure. A command hierarchy defines the relationship between command scopes, commands, and parameters. The command hierarchy may be represented by a list, a linked list, a graph, a tree, or the like. FIG. 11 depicts the command hierarchy as a graph structure.

As represented in a graph structure, the command hierarchy may have nodes representing scopes, commands, and parameters. A scope node, such as scope node 1105, may represent a scope and may be specified in the command bar by a command scope operator followed by a command scope identifier. Scope operators may be one or more characters, such as a '@' character. Commands may be represented by command nodes, such as for example command nodes 1107, 1113, and 1117. Valid commands for a given scope may be represented by an edge between the scope node and the command node. In the example of FIG. 11 the scope represented by scope node 1105 may be associated with various commands represented by command nodes 1 1107, command nodes 2 1113, and command nodes 3 1117. Commands may be delimited in the command bar by a command operator. Command operators may be one or more characters, such as a '/' character.

Command parameters may be represented in the graph by a parameter node. For example, command 1 represented by command 1 node 1107 is associated with 1 . . . n parameters represented by parameter nodes 1109-1111. Each parameter node may have a type, a value, a length (maximum, minimum, or exact length), a name, and other data that specifies allowed values for the parameter. Type specifies the type of data (alphanumeric, numeric, persons, calendar dates, and the like), value specifies allowed values (e.g., ranges or values that are valid), length specifies a length of data, and a name specifies a display name for the parameter. Command 2 represented by command 2 node 1113 may have one parameter represented by parameter node 1115. In some examples commands, such as command 3 represented by command 3 node 1117 may have zero parameters.

As previously described, some commands may be valid for multiple scopes. In these examples, a command may have multiple links to each of the scope nodes to which the command is valid. While a single scope node is shown in FIG. 11, it will be appreciated by one of ordinary skill with the benefit of the present disclosure that additional scopes may be present.

Figure 12:
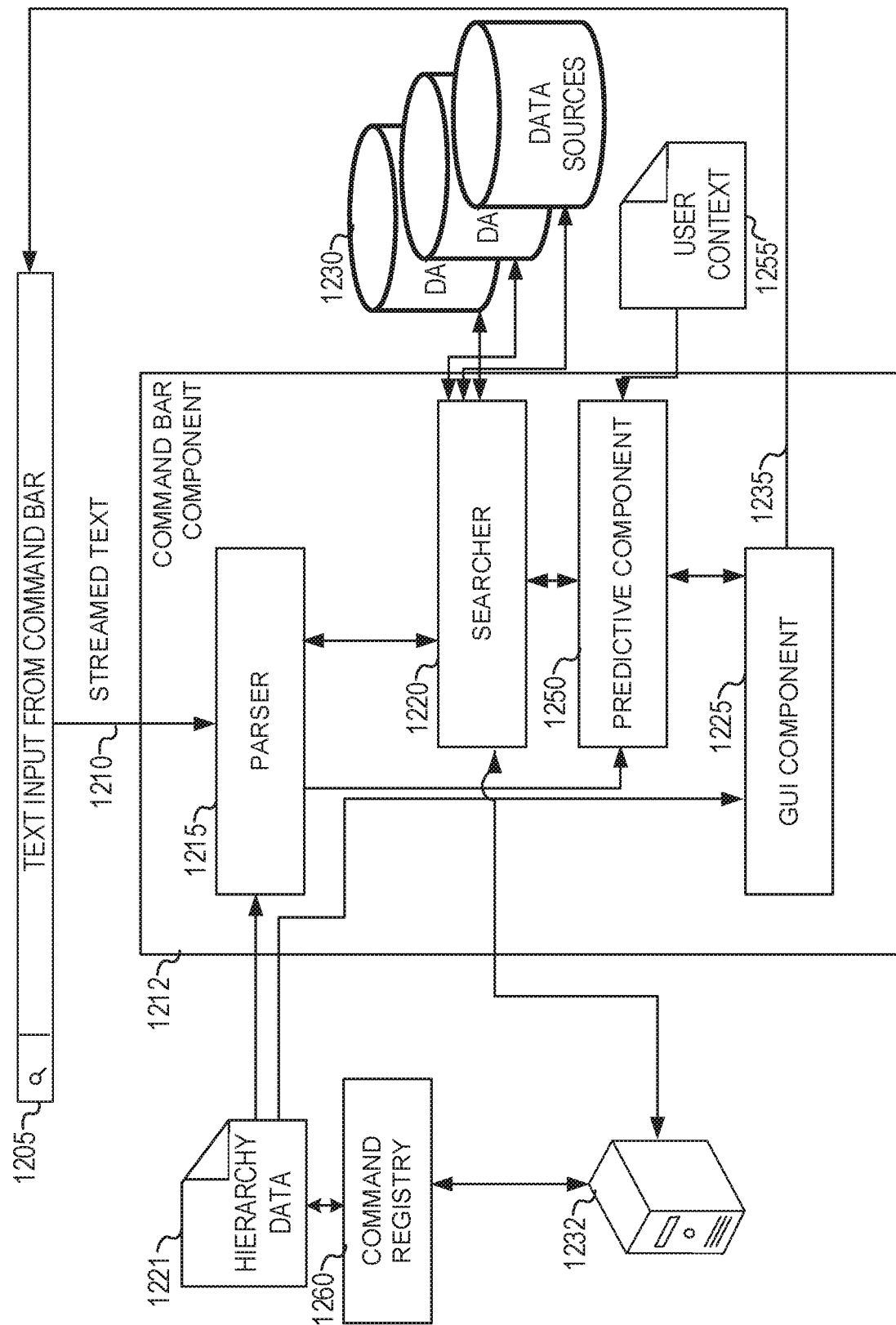
FIG. 12 illustrates a data flow diagram of a command bar system according to some examples of the present disclosure.

FIG. 12 illustrates a data flow diagram of a command bar system according to some examples of the present disclosure. In some examples, an application, operating system, or other software component may execute a command bar component on a computing device. A command bar component 1212 may have a GUI component 1225 which may create, display, and update a command bar, such as command bar 1205. GUI component 1225 may also create, update, and display the predictive text box below the command bar.

Text entered into the command bar 1210 is streamed to a parser 1215 such that text is sent to the parser 1215 as it is entered by the user. Thus, the input is sent on a character-by-character basis prior to entry of a commit instruction in contrast to sending when a user presses 'enter' or 'return' key, which traditionally indicates the user is ready to submit the contents of the command bar. Parser 1215 uses command hierarchy data 1221 (e.g., such as a hierarchy shown in FIG. 11) to determine whether the user has entered a scope or command operator or another character. If the user has entered a scope or command operator then, based upon the hierarchy data, matching scopes and/or commands are provided to the predictive component 1250.

For example, if the user enters only a scope command operator (without an identifier), then all scopes are provided to the predictive component 1250. If the user enters only a command operator, then all commands are provided by the parser 1215 from the command hierarchy data 1221 to the predictive component 1250. If the user has entered a scope operator and additional text, then scopes matching the additional text may be provided by the parser 1215 to the predictive component 1250. If the user has entered a command operator and additional text, then commands matching the additional text may be provided to the predictive component 1250 by the parser 1215. In the example in which a user has entered a command operator, if the user previously had set a scope, then only commands matching that scope may be shown in the predictive text box. If the user has not previously set a scope, then commands corresponding to a default scope (which may be a global scope) may be provided.

The predictive component may order the matching commands and/or scopes based upon a calculated likelihood of selection by the user. The likelihood of selection may be calculated using one or more features. Features may include user contexts such as a user's schedule, files previously interacted with, persons previously communicated with, when those communications or interactions occurred, connections of a user on a social networking service, connections of a user to other users within an organization (e.g., files a boss worked on recently may be very relevant to the user), matching commands and/or scopes that were most recently used by the user or users that are associated with the user (e.g., friends, connections, colleagues, coworkers, or the like), commands and/or scopes relevant to a conversation the user is having, or the like.

As used herein, the term candidate may be a matching command, scope, parameter value or result that matches information currently entered into the command bar. A relevance of each candidate may be calculated by scoring each candidate based upon the aforementioned features. For example, each feature may have an associated score that is then weighted and summed to produce a score for each of the matching candidates. Candidates with the highest scores may be listed first in a predictive guess box. The weights for the weighted summation may be predetermined and may be set by an administrator. In other examples, the weights may be learned using one or more machine learning algorithms (as described below with reference to FIG. 13). In still other examples, the features of the candidate and user may be applied to a machine learned model and the model itself may determine which of the candidates are to be listed in the predictive guess box and in which order. GUI component 1225 may update a predictive guess box with the candidates in the order determined by predictive component 1250.

If the text entered by the user is not a scope operator or identifier or a command operator or identifier, then the text is presumed to be parameters for a default command. Upon submitting a commit instruction (e.g., pressing enter), the default command is executed on a global scope. For example, the search box may have a default command such as a search command with global scope. The text entered is then interpreted as a search query that is issued to searcher 1220 that may search data sources 1230. Matching data may then be sorted by predictive component 1250 based upon a relevance score and then presented to the user via the GUI component 1225.

Once a user has selected a scope (e.g., by entering a scope operator and identifier and then a commit instruction), subsequent text is interpreted as applying only to that scope. For example, only commands corresponding to that scope are legal commands.

Once a user selects a command (e.g., by pressing enter or other key indicating a desire to accept an entered scope), if there are no parameters, then the command may be executed. If the command has parameters, then the GUI component 1225 may update the search box to include a set of visually delineated and selectable command parameter input segments inside the command bar, each one corresponding to a different one of the set of parameters. For example, as shown in FIG. 5. Upon receiving user input (partial or full text input) directed to these segments, the parser 1215 determines which parameter the text is associated with and sends the text to the searcher 1220 along with an indication of what command, scope, parameter, and information about the parameter (such as parameter type). Based upon the command and scope information, the searcher 1220 searches data sources 1230 to determine possible parameter values. The list of possible parameter values along with the command and scope information is sent to predictive component 1250. Predictive component 1250 uses this information and the user context information 1255 to score the possible parameter values and provide the scored parameter values to the GUI component 1225. GUI component 1225 may then select and display the possible parameter values as an update to the command bar 1235 in an order reflective of their scores.

Candidates and command results (e.g., search results) may be based upon searches of one or more data sources 1230 and command hierarchy data 1221. One or more data sources 1230 may be on a same computing device that the command bar component 1212 is executing, but in other examples, one or more data sources 1230 may be on an external computing device, such as external computing device 1232. In some examples, one or more data sources 1230 may be an external service, such as a search engine. In some examples, external computing devices, such as computing device 1232 may register, through a command registry, such as command registry 1260 to register one or more scopes and commands. Commands, when executed may be routed by parser 1215 to either the application that created the command bar 1205, external services run on a computing device 1232, or the like, depending on information in the hierarchy. Communications with external computing device 1232 may be done through one or more Application Programming Interfaces (API), such as a Representational State Transfer (REST) API.

Figure 13:
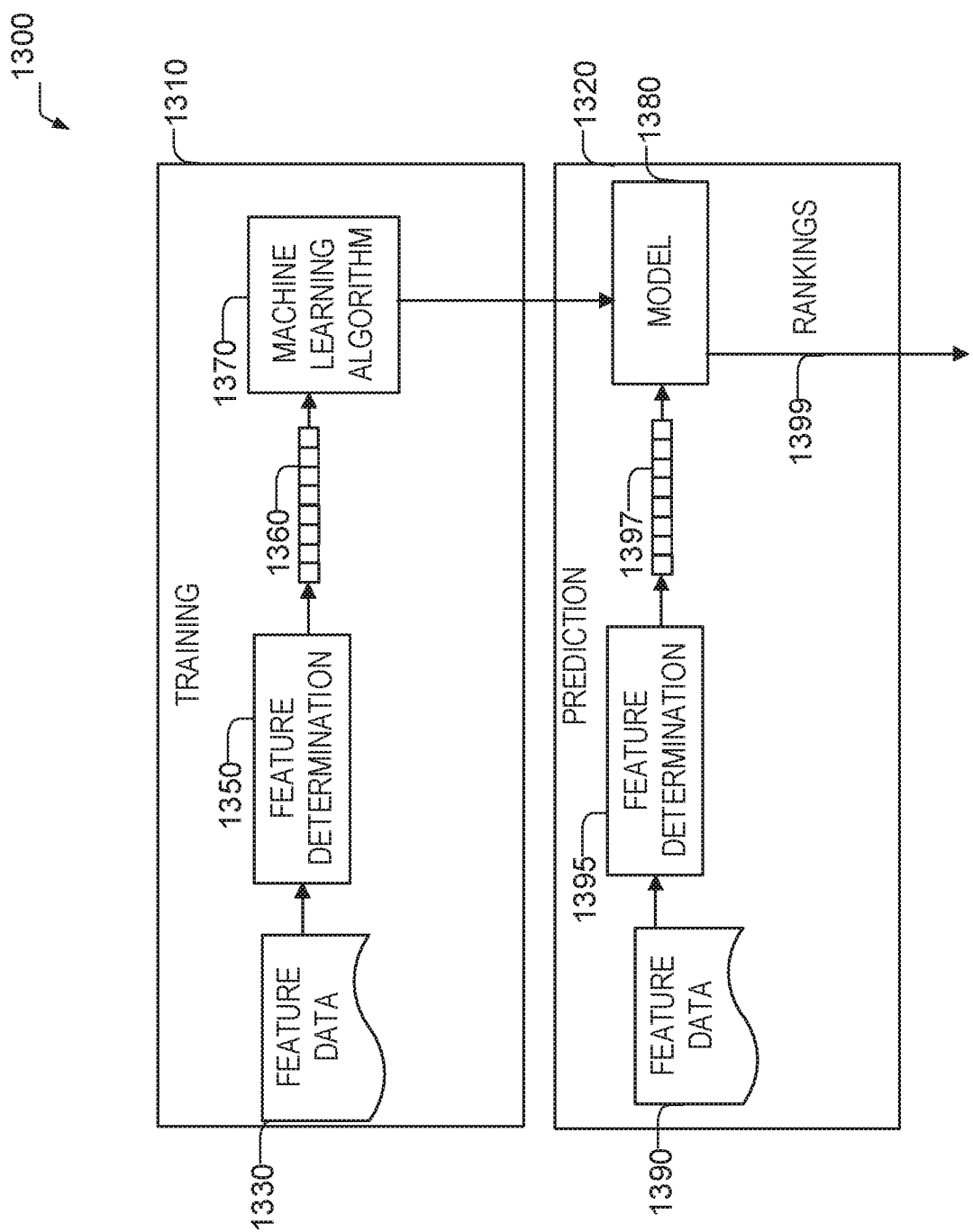
FIG. 13 illustrates an example machine learning module according to some examples of the present disclosure.

As previously described, one or more candidate scopes, commands, and parameter values may be presented to the user in a predictive box in an order reflective of the system's prediction of the candidate's relevance to the user. The relevance may be determined based upon a number of algorithms, including one or more machine learning algorithms. FIG. 13 illustrates an example machine learning module 1300 according to some examples of the present disclosure. Machine learning module 1300 is one example component of and may produce one or more machine learning models 1380 that may be used by a command bar component to make predictions for the predictions box. Machine learning module 1300 may utilize a training module 1310 and a prediction module 1320. Training module 1310 feeds feature data 1330 into feature determination module 1350. The feature data 1330 includes user contexts and other features (e.g., recent user activity, recent activity for users associated with the user, and the like), and in some examples one or more parameters, command scopes, commands, a list of matching entries, and the like. In some examples, the features may be explicitly labeled with relevant predictions.

Feature determination module 1350 determines one or more features for feature vector 1360 from this information. Features of the feature vector 1360 are a set of the information input and is information determined to be predictive of relevant candidates. Features may be all the feature data 1330 or in some examples, may be a subset of all the feature data 1330. Thus, part of training the machine learning model 1380 may be determining an importance of the feature data 1330 to predicting relevant candidates. In examples in which the features are a subset of the feature data 1330, a predetermined list of which feature data 1330 is included as a feature in the feature vector 1360 may be utilized. The feature vector 1360 may be utilized (along with any applicable labels) by the machine learning algorithm 1370 to produce a machine learning model 1380.

In the prediction module 1320, the feature data of the current user and currently matching entries 1390 (e.g., possible user choices given what the user may have already entered) may be input to the feature determination module 1395. Feature determination module 1395 may determine the same set of features or a different set of features as feature determination module 1350. In some examples, feature determination modules 1350 and 1395 are the same module. Feature determination module 1395 produces feature vector 1397, which are input into the machine learning model 1380 to generate a score for each of the possible user choices 1399.

The training module 1310 may operate in an offline manner to train the machine learning model 1380. The prediction module 1320, however, may be designed to operate in an online manner. It should be noted that the machine learning model 1380 may be periodically updated via additional training and/or user feedback. For example, additional feature data 1330 may be collected as users select various candidates from the prediction box. The user's context and possible choices may then be fed back through the training module 1310 labelled with the choice the user chose in order to refine the machine learning model 1380.

The machine learning algorithm 1370 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Intercommand Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 1310.

Figure 14:
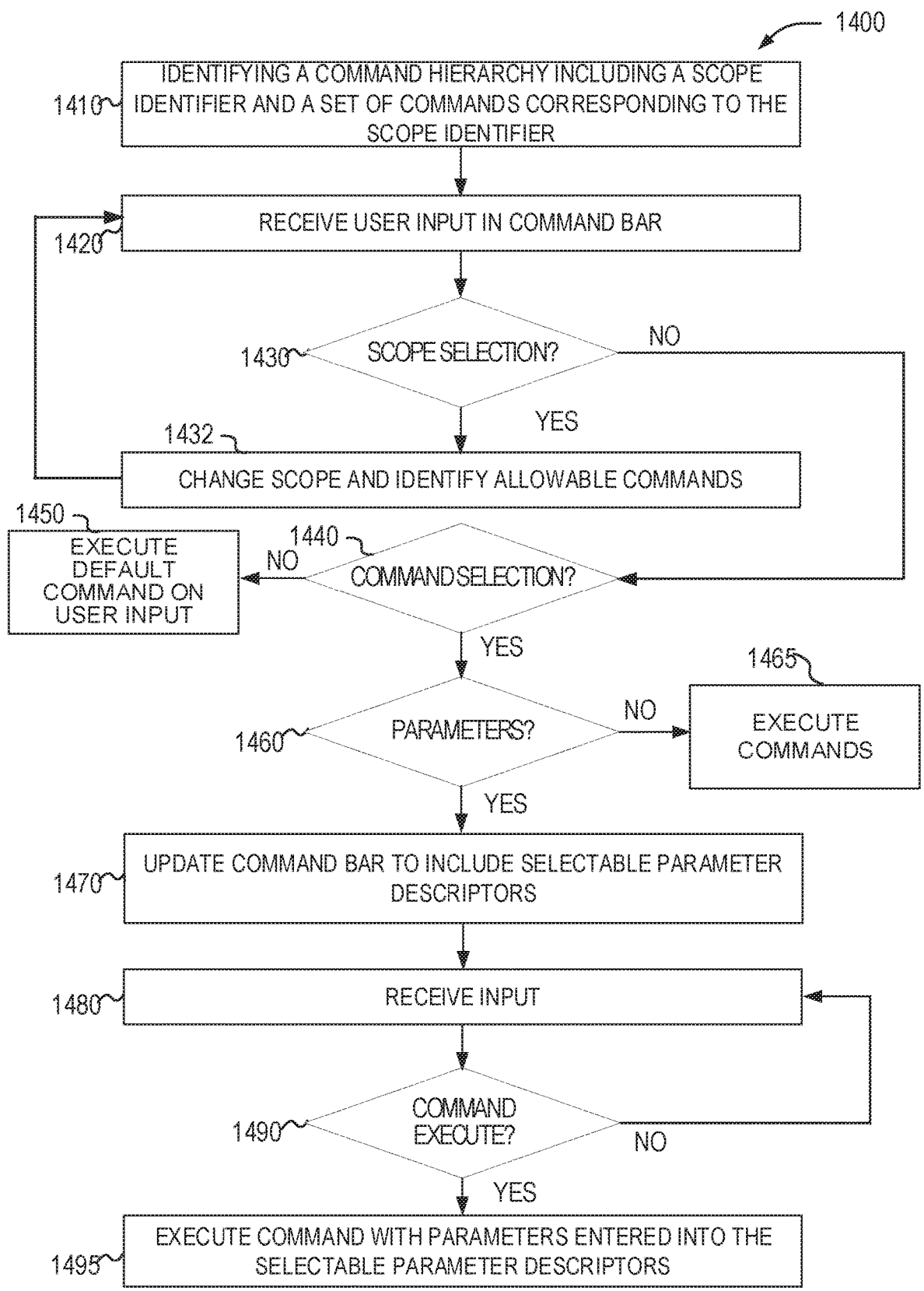
FIG. 14 illustrates a method of parsing a command bar according to some examples of the present disclosure.

FIG. 14 illustrates a method 1400 of parsing a command bar according to some examples of the present disclosure. At operation 1410, the system identifies a command hierarchy (such as shown in FIG. 11). Operation 1410 may be performed upon initialization of the command bar, periodically (e.g., to detect changes), or every time input is directed to the command bar. At operation 1420 user input is received in the command bar. As noted previously, prior to the user submitting a commit instruction (e.g., submitting a user input that indicates they are committing to the input they entered such as pressing an enter key), the system may predict one or more candidates in the prediction box. Once the input is committed, a determination is made at operation 1430 if the user is entering a scope selection (e.g., using a scope operator and scope identifier). If it is a scope selection, then at operation 1432, the scope is changed in the system and allowable commands are identified. Operation then returns to operation 1420 waiting for additional user input.

If at operation 1430, the input is not a scope selection, then operation 1440 it is determined if the input is a legal command (e.g., given a current scope). If not, then at operation 1450, the system executes a default command on the user input. If the input is a command, then at operation 1460 it is determined if there are any parameters corresponding to the command. If not, then at operation 1465, the command is executed. The command may be executed based upon a current scope, which may be the default scope or a previously selected scope. If there are parameters, then at operation 1470 the command bar is updated to include selectable parameter input segments for each parameter. At operation 1480 input is received in the command bar directed to one of the parameter input segments. At operation 1490 it is determined if the input is an command execute input (e.g., pressing enter after entering the last parameter value, pressing an execute button, or the like). If the input is a command execute input, then at operation 1495, the system executes the command with the parameter values that were entered into the selectable parameter input segments. If the input is to a selectable parameter segment and is not a command execute input, the value input is saved as a value for that parameter. As previously described, the system may have a prediction box that attempts to predict the parameter values based upon a user's context and other features.

Figure 15:
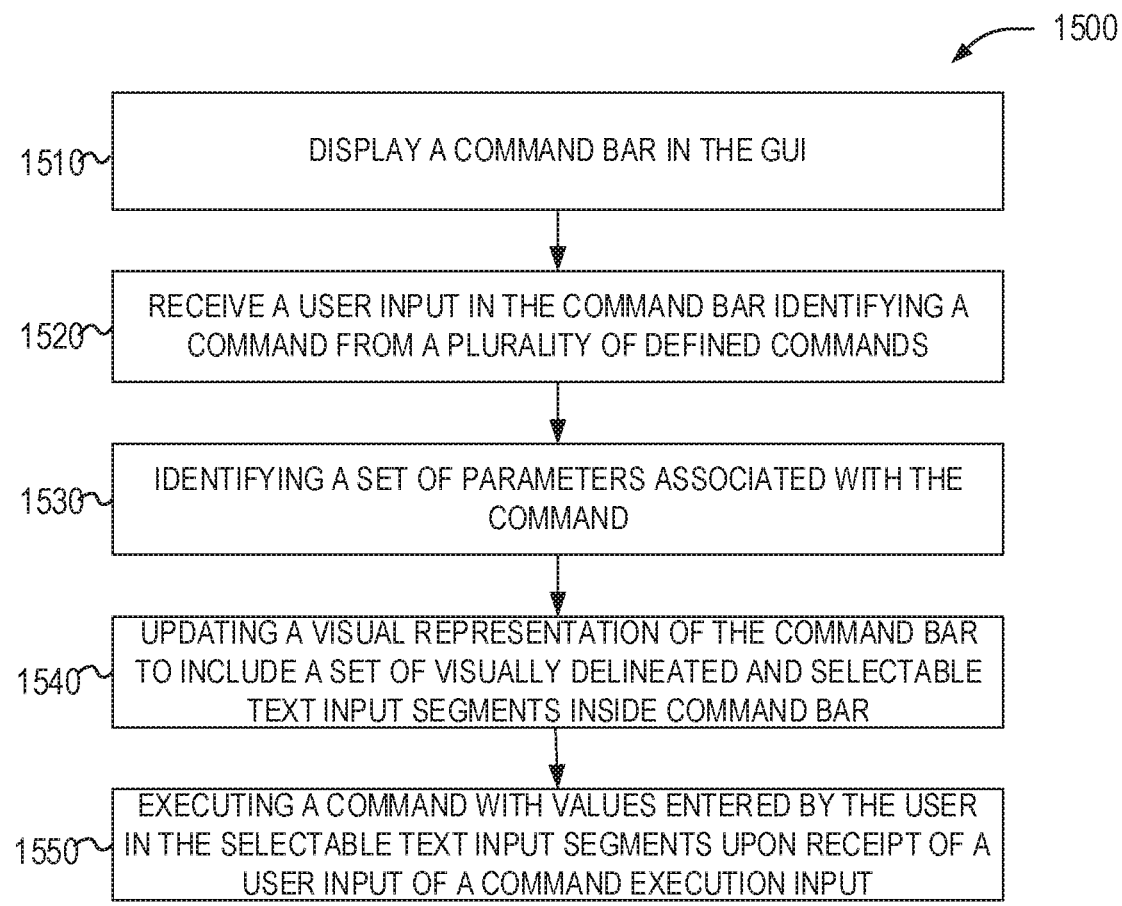
FIGS. 15 and 16 illustrate flowcharts of a method of a command bar according to some examples of the present disclosure.

FIG. 15 illustrates a flowchart of a method 1500 of a command bar according to some examples of the present disclosure. Method 1500 is one example of the method 1400. At operation 1510, the system causes a command bar to be displayed. For example, as part of an application's GUI. The system may cause the command bar to be displayed by sending instructions to a display driver to cause the display driver to render the command bar on the display.

At operation 1520, the system may receive a user input in the command bar identifying a command from a plurality of defined commands. Operation 1520 may occur before a scope is identified, in which case a default scope (such as a global scope) may be applied. Operation 1520 may also occur after a scope is identified (not shown in the figure), in which case the command is scoped to the chosen scope. The user input identifying a command may be a user input with a command operator (e.g., a '/' character) and a command identifier (e.g., a name of the command). The user may enter a command operator followed by a command identifier and press a key or button (e.g., an "enter" key) that signals an intent of the user to commit to selecting that command.

At operation 1530 one or more parameters may be determined for the identified command. For example, based upon a command hierarchy, the system may determine one or more command parameters. At operation 1540, a visual representation of the command bar is updated to include a set of visually delineated and selectable text input segments inside the command bar. The visual representation may include a parameter name in a grayed out or transparent font, and may have an indication (e.g., an icon, text, or the like) of what type of parameter (e.g., a text entry, a calendar date, a number (and the range), and the like. The segments may be selectable, such as by clicking in the segment, tapping in the segment, or other navigation input to the segment.

At operation 1550 the system may execute the command identified in operation 1520 using parameters entered into the parameter input segments. The command may be executed upon receipt of a commit instruction such as a user pressing an enter key, a user entry into the last parameter, or a user input tapping, clicking, or otherwise selecting a GUI element for committing the command (e.g., an "ok" button).

Figure 16:
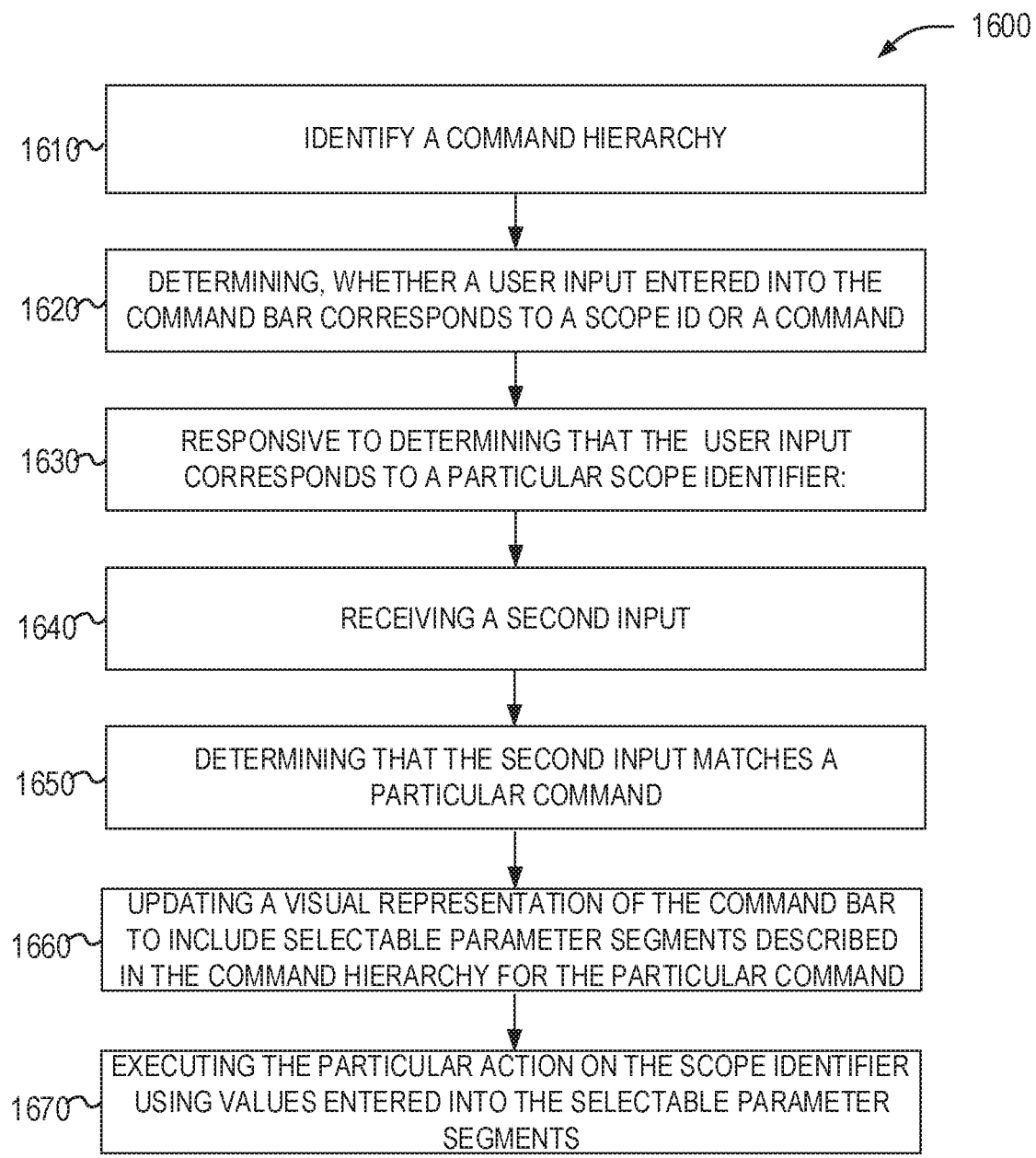

FIG. 16 shows a flowchart of a method 1600 of operating a command bar according to some examples of the present disclosure. Method 1600 is one example of the method of 1400. At operation 1610 the system may identify a command hierarchy. For example, a plurality of scopes and a plurality of commands. The command hierarchy may also specify the commands that are applicable for each of the plurality of scopes and a plurality of parameters for each command. As previously discussed, the command hierarchy may be represented in a variety of ways, such as a graph structure. The command hierarchy may be stored in a local storage and the operation of identifying the command hierarchy may be loading the command hierarchy from non-volatile storage to volatile memory.

At operation 1620 the system determines whether a user input entered into the command bar corresponds to an identification of a scope or a command. For example, if the user enters a command operator (e.g., '/'), the text following the command operator may be a command identifier. If the user enters a scope operator (e.g., '@') the text following the scope operator is a scope identifier. If the user does not enter either a scope or command identifier, then the user input is submitted as a parameter for a default command with the current (or default) scope.

At operation 1630, responsive to determining that the user input corresponds to a particular scope identifier—e.g., the user entered a command operator followed by a command identifier that matches a valid scope in the command hierarchy, the system performs the operations of 1640, 1650, and 1660. At operation 1640 a second input is received directed to the command bar. At operation 1650 the system determines that the second input matches a particular command that is valid for the indicated scope. For example, the user enters a command operator (e.g., '/') followed by a command identifier that matches a command in the command hierarchy. If the selected command does not have any parameters (as indicated in the command hierarchy) the command may be executed immediately (e.g., flow may skip to operation 1670).

If the command has parameters, then at operation 1660 the system updates a visual representation of the command bar to include selectable parameter input segments for parameters described in the command hierarchy for the particular command. For example, the parameter input segments 509, 511, 513, 515 from FIG. 5. Once the user has entered parameter values into the parameter input segments and entered input indicating that the user is committing to executing the command, then at operation 1670 the system may execute the particular action on the scope identifier using values entered into the selectable parameter input segments.

Figure 17:
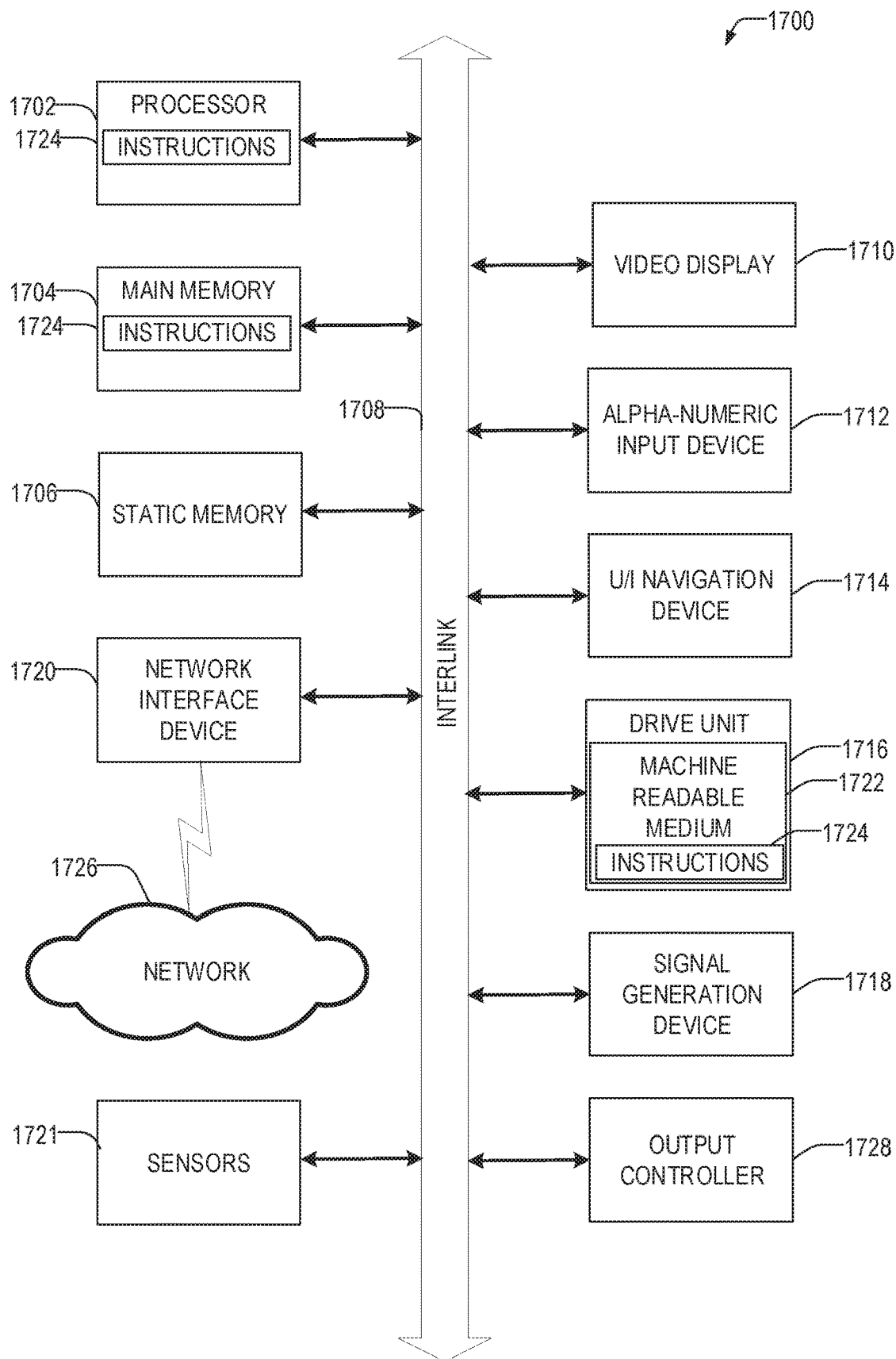
FIG. 17 is a block diagram illustrating an example of a machine upon which one or more embodiments may be implemented.

FIG. 17 illustrates a block diagram of an example machine 1700 upon which any one or more of the techniques (e.g., methodologies) discussed herein may perform. In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify commands to be taken by that machine. Machine 1700 may render GUIs from FIGS. 1-10, process and/or create the command hierarchy of FIG. 11, be configured to operate the command bar component 1212 of FIG. 12 (including the command registry 1260 and storing the command hierarchy data 1221 and data sources 1230, and collect user context information 1255). Machine 1700 may implement the training module 1310 and prediction module 1320 of FIG. 13, and perform the methods of FIGS. 14-16. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine readable media.

While the machine readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1724 may further be transmitted or received over a communications network 1726 using a transmission medium via the network interface device 1720. The Machine 1700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SIMO), multiple-input multiple-output (MIMO), or multiple-input single-output (MISO) techniques. In some examples, the network interface device 1720 may wirelessly communicate using Multiple User MIMO techniques.

Other Notes and Examples

Example 1 is a computerized method of executing commands in a graphical user interface (GUI), the method comprising: displaying a command bar in the GUI; receiving a user input in the command bar identifying a command from a plurality of defined commands; identifying a set of parameters associated with the command; updating a visual representation of the command bar to include, a set of visually delineated and selectable text input segments inside the command bar, each one of the set of selectable text input segments corresponding to a different one of the set of parameters; and executing the command with values entered by the user in the selectable text input segments upon receipt of a user input of a command execution input.

In Example 2, the subject matter of Example 1 includes, receiving a second user input in a first one of the set of selectable text input segments, the second user input being a text input stream; and showing a suggestion box proximate to the command bar to show parameter value matches to the second user input.

In Example 3, the subject matter of Examples 1-2 includes, receiving a second user input in a first one of the set of selectable text input segments; receiving a selection of a second one of the set of selectable text input segments; and showing a suggestion box proximate to the command bar, the suggestion box populated with a set of parameter suggestions for a parameter corresponding to the second one of the set of selectable text input segments, the set of parameter suggestions based upon the command and the second user input.

In Example 4, the subject matter of Examples 1-3 includes, providing a set of one or more results in a results box that is proximate to the command bar.

In Example 5, the subject matter of Examples 1-4 includes, wherein the user input comprises a scope identifier that identifies an application to execute the command and wherein executing the command with the values entered by the user in the selectable text input segments upon receipt of the user input of the command execution input comprises calling the application with the values entered by the user as parameters.

In Example 6, the subject matter of Example 5 includes, wherein the executing the command comprises messaging an application that is not an application that caused the displaying of the command bar in the GUI.

In Example 7, the subject matter of Example 6 includes, wherein the messaging is one of: over a network, or through inter-process communication.

In Example 8, the subject matter of Examples 1-7 includes, wherein the command is not a search command.

Example 9 is a computing device comprising: a processor; a memory, storing instructions, which when executed by the processor, causes the processor to perform operations comprising: displaying a command bar in the GUI; receiving a user input in the command bar identifying a command from a plurality of defined commands; identifying a set of parameters associated with the command; updating a visual representation of the command bar to include, a set of visually delineated and selectable text input segments inside the command bar, each one of the set of selectable text input segments corresponding to a different one of the set of parameters; and executing the command with values entered by the user in the selectable text input segments upon receipt of a user input of a command execution input.

In Example 10, the subject matter of Example 9 includes, wherein the operations further comprise: receiving a second user input in a first one of the set of selectable text input segments, the second user input being a text input stream; and showing a suggestion box proximate to the command bar to show parameter value matches to the second user input.

In Example 11, the subject matter of Examples 9-10 includes, wherein the operations further comprise: receiving a second user input in a first one of the set of selectable text input segments; receiving a selection of a second one of the set of selectable text input segments; and showing a suggestion box proximate to the command bar, the suggestion box populated with a set of parameter suggestions for a parameter corresponding to the second one of the set of selectable text input segments, the set of parameter suggestions based upon the command and the second user input.

In Example 12, the subject matter of Examples 9-11 includes, wherein the operations further comprise: providing a set of one or more results in a results box that is proximate to the command bar.

In Example 13, the subject matter of Examples 9-12 includes, wherein the user input comprises a scope identifier that identifies an application to execute the command and wherein the operations of executing the command with the values entered by the user in the selectable text input segments upon receipt of the user input of the command execution input comprises calling the application with the values entered by the user as parameters.

In Example 14, the subject matter of Example 13 includes, wherein the operations of executing the command comprises messaging an application that is not an application that caused the displaying of the command bar in the GUI.

In Example 15, the subject matter of Example 14 includes, wherein the messaging is one of: over a network, or through inter-process communication.

In Example 16, the subject matter of Examples 9-15 includes, wherein the command is not a search command.

Example 17 is a machine-readable medium, storing instructions, which when executed by a machine, causes the machine to perform operations comprising: displaying a command bar in the GUI; receiving a user input in the command bar identifying a command from a plurality of defined commands; identifying a set of parameters associated with the command; updating a visual representation of the command bar to include, a set of visually delineated and selectable text input segments inside the command bar, each one of the set of selectable text input segments corresponding to a different one of the set of parameters; and executing the command with values entered by the user in the selectable text input segments upon receipt of a user input of a command execution input.

In Example 18, the subject matter of Example 17 includes, wherein the operations further comprise: receiving a second user input in a first one of the set of selectable text input segments, the second user input being a text input stream; and showing a suggestion box proximate to the command bar to show parameter value matches to the second user input.

In Example 19, the subject matter of Examples 17-18 includes, wherein the operations further comprise: receiving a second user input in a first one of the set of selectable text input segments; receiving a selection of a second one of the set of selectable text input segments; and showing a suggestion box proximate to the command bar, the suggestion box populated with a set of parameter suggestions for a parameter corresponding to the second one of the set of selectable text input segments, the set of parameter suggestions based upon the command and the second user input.

In Example 20, the subject matter of Examples 17-19 includes, wherein the operations further comprise: providing a set of one or more results in a results box that is proximate to the command bar.

In Example 21, the subject matter of Examples 17-20 includes, wherein the user input comprises a scope identifier that identifies an application to execute the command and wherein the operations of executing the command with the values entered by the user in the selectable text input segments upon receipt of the user input of the command execution input comprises calling the application with the values entered by the user as parameters.

In Example 22, the subject matter of Example 21 includes, wherein the operations of executing the command comprises messaging an application that is not an application that caused the displaying of the command bar in the GUI.

In Example 23, the subject matter of Example 22 includes, wherein the messaging is one of: over a network, or through inter-process communication.

In Example 24, the subject matter of Examples 17-23 includes, wherein the command is not a search command.

Example 25 is a computing device comprising: means for displaying a command bar in the GUI; means for receiving a user input in the command bar identifying a command from a plurality of defined commands; means for identifying a set of parameters associated with the command; means for updating a visual representation of the command bar to include, a set of visually delineated and selectable text input segments inside the command bar, each one of the set of selectable text input segments corresponding to a different one of the set of parameters; and means for executing the command with values entered by the user in the selectable text input segments upon receipt of a user input of a command execution input.

In Example 26, the subject matter of Example 25 includes, means for receiving a second user input in a first one of the set of selectable text input segments, the second user input being a text input stream; and means for showing a suggestion box proximate to the command bar to show parameter value matches to the second user input.

In Example 27, the subject matter of Examples 25-26 includes, means for receiving a second user input in a first one of the set of selectable text input segments; means for receiving a selection of a second one of the set of selectable text input segments; and means for showing a suggestion box proximate to the command bar, the suggestion box populated with a set of parameter suggestions for a parameter corresponding to the second one of the set of selectable text input segments, the set of parameter suggestions based upon the command and the second user input.

In Example 28, the subject matter of Examples 25-27 includes, means for providing a set of one or more results in a results box that is proximate to the command bar.

In Example 29, the subject matter of Examples 25-28 includes, wherein the user input comprises a scope identifier that identifies an application to execute the command and wherein the means for executing the command with the values entered by the user in the selectable text input segments upon receipt of the user input of the command execution input comprises means for calling the application with the values entered by the user as parameters.

In Example 30, the subject matter of Example 29 includes, wherein the means for executing the command comprises means for messaging an application that is not an application that caused the displaying of the command bar in the GUI.

In Example 31, the subject matter of Example 30 includes, wherein the messaging is one of: over a network, or through inter-process communication.

In Example 32, the subject matter of Examples 25-31 includes, wherein the command is not a search command.

Example 33 is a computing device comprising: a processor; a memory, the memory comprising instructions, which when executed by the processor, cause the processor to perform operations comprising: identifying a command hierarchy, the command hierarchy including a scope identifier and a set of commands corresponding to the scope identifier; determining, based upon an operator, whether a text user input entered into a command bar of a graphical user interface (GUI) corresponds to a particular scope identifier of the one or more scope identifiers or a particular command of the set of one or more commands corresponding to the one or more scope identifiers; responsive to determining that the text user input corresponds to the particular scope identifier: receiving a second text user input from the command bar; and determining that the second free text user input matches the particular command from the set of commands corresponding to the one or more scope identifiers; updating a visual representation of the command bar to include, selectable parameter descriptors described in the command hierarchy for the particular command; and responsive to receipt of commit input, executing the particular command on the scope identifier using values entered into the selectable parameter descriptors.

In Example 34, the subject matter of Example 33 includes, wherein the particular command is a search, and wherein the selectable parameter descriptors are search filters and wherein the particular scope identifier is a type of content to search.

In Example 35, the subject matter of Example 34 includes, wherein the search filters are dependent on the type of content to search.

In Example 36, the subject matter of Examples 33-35 includes, wherein at least one of the scope identifiers is a name of an application that is different than an application displaying the command bar, and wherein the operation of executing the particular command on the scope identifier comprises calling the application to execute the particular command using the values entered into the selectable parameter descriptors.

In Example 37, the subject matter of Examples 33-36 includes, wherein at least one of the scope identifiers is a type of data, and wherein the operation of executing the particular command on the scope identifier comprises executing the command on data that matches the type of data using the values entered into the selectable parameter descriptors.

In Example 38, the subject matter of Examples 33-37 includes, wherein the operations of identifying the command hierarchy comprise downloading at least a portion of the command hierarchy from a network-based service.

In Example 39, the subject matter of Examples 33-38 includes, wherein the operations of identifying the command hierarchy comprise retrieving at least a portion of the command hierarchy from a registry of the computing device.

In Example 40, the subject matter of Examples 33-39 includes, wherein the operations further comprise: receiving a command and a set of parameters corresponding to the command from a second application that is different from an application that displays the command bar; adding the command and the set of parameters in the hierarchy as associated with a scope identifier corresponding to the second application; wherein the particular scope identifier identified by the first free text user input corresponds to the second application, and wherein the second free text input matches the command received from the second application, and wherein the operations of executing the particular command on the scope identifier using values entered into the selectable parameter descriptors comprises calling the second application to execute the command and providing the values entered into the selectable parameters.

Example 41 is a machine-readable medium storing instructions, which when executed by a machine, causes the machine to perform operations comprising: identifying a command hierarchy, the command hierarchy including a scope identifier and a set of commands corresponding to the scope identifier; determining, based upon an operator, whether a text user input entered into a command bar of a graphical user interface (GUI) corresponds to a particular scope identifier of the one or more scope identifiers or a particular command of the set of one or more commands corresponding to the one or more scope identifiers; responsive to determining that the text user input corresponds to the particular scope identifier: receiving a second text user input from the command bar; and determining that the second free text user input matches the particular command from the set of commands corresponding to the one or more scope identifiers; updating a visual representation of the command bar to include, selectable parameter descriptors described in the command hierarchy for the particular command; and responsive to receipt of commit input, executing the particular command on the scope identifier using values entered into the selectable parameter descriptors.

In Example 42, the subject matter of Example 41 includes, wherein the particular command is a search, and wherein the selectable parameter descriptors are search filters and wherein the particular scope identifier is a type of content to search.

In Example 43, the subject matter of Example 42 includes, wherein the search filters are dependent on the type of content to search.

In Example 44, the subject matter of Examples 41-43 includes, wherein at least one of the scope identifiers is a name of an application that is different than an application displaying the command bar, and wherein the operation of executing the particular command on the scope identifier comprises calling the application to execute the particular command using the values entered into the selectable parameter descriptors.

In Example 45, the subject matter of Examples 41-44 includes, wherein at least one of the scope identifiers is a type of data, and wherein the operation of executing the particular command on the scope identifier comprises executing the command on data that matches the type of data using the values entered into the selectable parameter descriptors.

In Example 46, the subject matter of Examples 41-45 includes, wherein the operations of identifying the command hierarchy comprise downloading at least a portion of the command hierarchy from a network-based service.

In Example 47, the subject matter of Examples 41-46 includes, wherein the operations of identifying the command hierarchy comprise retrieving at least a portion of the command hierarchy from a registry of the machine-readable medium.

In Example 48, the subject matter of Examples 41-47 includes, wherein the operations further comprise: receiving a command and a set of parameters corresponding to the command from a second application that is different from an application that displays the command bar; adding the command and the set of parameters in the hierarchy as associated with a scope identifier corresponding to the second application; wherein the particular scope identifier identified by the first free text user input corresponds to the second application, and wherein the second free text input matches the command received from the second application, and wherein the operations of executing the particular command on the scope identifier using values entered into the selectable parameter descriptors comprises calling the second application to execute the command and providing the values entered into the selectable parameters.

Example 49 is a computerized method of executing commands in a graphical user interface (GUI), the method comprising: identifying a command hierarchy, the command hierarchy including a scope identifier and a set of commands corresponding to the scope identifier; determining, based upon an operator, whether a text user input entered into a command bar of the GUI corresponds to a particular scope identifier of the one or more scope identifiers or a particular command of the set of one or more commands corresponding to the one or more scope identifiers; responsive to determining that the text user input corresponds to the particular scope identifier: receiving a second text user input from the command bar; and determining that the second free text user input matches the particular command from the set of commands corresponding to the one or more scope identifiers; updating a visual representation of the command bar to include, selectable parameter descriptors described in the command hierarchy for the particular command; and responsive to receipt of commit input, executing the particular command on the scope identifier using values entered into the selectable parameter descriptors.

In Example 50, the subject matter of Example 49 includes, wherein the particular command is a search, and wherein the selectable parameter descriptors are search filters and wherein the particular scope identifier is a type of content to search.

In Example 51, the subject matter of Example 50 includes, wherein the search filters are dependent on the type of content to search.

In Example 52, the subject matter of Examples 49-51 includes, wherein at least one of the scope identifiers is a name of an application that is different than an application displaying the command bar, and wherein executing the particular command on the scope identifier comprises calling the application to execute the particular command using the values entered into the selectable parameter descriptors.

In Example 53, the subject matter of Examples 49-52 includes, wherein at least one of the scope identifiers is a type of data, and wherein executing the particular command on the scope identifier comprises executing the command on data that matches the type of data using the values entered into the selectable parameter descriptors.

In Example 54, the subject matter of Examples 49-53 includes, wherein identifying the command hierarchy comprise downloading at least a portion of the command hierarchy from a network-based service.

In Example 55, the subject matter of Examples 49-54 includes, wherein identifying the command hierarchy comprise retrieving at least a portion of the command hierarchy from a registry of the method.

In Example 56, the subject matter of Examples 49-55 includes, wherein the method further comprises: receiving a command and a set of parameters corresponding to the command from a second application that is different from an application that displays the command bar; adding the command and the set of parameters in the hierarchy as associated with a scope identifier corresponding to the second application; wherein the particular scope identifier identified by the first free text user input corresponds to the second application, and wherein the second free text input matches the command received from the second application, and wherein the operations of executing the particular command on the scope identifier using values entered into the selectable parameter descriptors comprises calling the second application to execute the command and providing the values entered into the selectable parameters.

Example 57 is a computing device comprising: means for identifying a command hierarchy, the command hierarchy including a scope identifier and a set of commands corresponding to the scope identifier; means for determining, based upon an operator, whether a text user input entered into a command bar of the GUI corresponds to a particular scope identifier of the one or more scope identifiers or a particular command of the set of one or more commands corresponding to the one or more scope identifiers; responsive to determining that the text user input corresponds to the particular scope identifier: means for receiving a second text user input from the command bar; and means for determining that the second free text user input matches the particular command from the set of commands corresponding to the one or more scope identifiers; means for updating a visual representation of the command bar to include, selectable parameter descriptors described in the command hierarchy for the particular command; and responsive to receipt of commit input, means for executing the particular command on the scope identifier using values entered into the selectable parameter descriptors.

In Example 58, the subject matter of Example 57 includes, wherein the particular command is a search, and wherein the selectable parameter descriptors are search filters and wherein the particular scope identifier is a type of content to search.

In Example 59, the subject matter of Example 58 includes, wherein the search filters are dependent on the type of content to search.

In Example 60, the subject matter of Examples 57-59 includes, wherein at least one of the scope identifiers is a name of an application that is different than an application displaying the command bar, and wherein the means for executing the particular command on the scope identifier comprises means for calling the application to execute the particular command using the values entered into the selectable parameter descriptors.

In Example 61, the subject matter of Examples 57-60 includes, wherein at least one of the scope identifiers is a type of data, and wherein the means for executing the particular command on the scope identifier comprises means for executing the command on data that matches the type of data using the values entered into the selectable parameter descriptors.

In Example 62, the subject matter of Examples 57-61 includes, wherein the means for identifying the command hierarchy comprise means for downloading at least a portion of the command hierarchy from a network-based service.

In Example 63, the subject matter of Examples 57-62 includes, wherein the means for identifying the command hierarchy comprise means for retrieving at least a portion of the command hierarchy from a registry of the method.

In Example 64, the subject matter of Examples 57-63 includes, means for receiving a command and a set of parameters corresponding to the command from a second application that is different from an application that displays the command bar; means for adding the command and the set of parameters in the hierarchy as associated with a scope identifier corresponding to the second application; wherein the particular scope identifier identified by the first free text user input corresponds to the second application, and wherein the second free text input matches the command received from the second application, and wherein the operations of executing the particular command on the scope identifier using values entered into the selectable parameter descriptors comprises calling the second application to execute the command and providing the values entered into the selectable parameters.

Example 65 is at least one machine-readable medium including instructions that, when executed by processing circuitry, cause the processing circuitry to perform operations to implement of any of Examples 1-64.

Example 66 is an apparatus comprising means to implement of any of Examples 1-64.

Example 67 is a system to implement of any of Examples 1-64.

Example 68 is a method to implement of any of Examples 1-64.

What is claimed is:

1. A computing device comprising:
    a processor;
    a memory, the memory comprising instructions, which when executed by the processor, cause the processor to perform operations comprising:
        identifying a command hierarchy, the command hierarchy including a scope identifier and a set of commands corresponding to the scope identifier;
        determining, based upon an operator, whether a text user input entered into a command bar of a graphical user interface (GUI) corresponds to a particular scope identifier of the one or more scope identifiers or a particular command of the set of one or more commands corresponding to the one or more scope identifiers;
        responsive to determining that the text user input corresponds to the particular scope identifier:
            receiving a second text user input from the command bar; and
            determining that the second free text user input matches the particular command from the set of commands corresponding to the one or more scope identifiers;
        updating a visual representation of the command bar to include selectable parameter descriptors described in the command hierarchy for the particular command; and
        responsive to receipt of commit input, executing the particular command on the scope identifier using values entered into the selectable parameter descriptors.

2. The computing device of claim 1, wherein the particular command is a search, and wherein the selectable parameter descriptors are search filters and wherein the particular scope identifier is a type of content to search.

3. The computing device of claim 2, wherein the search filters are dependent on the type of content to search.

4. The computing device of claim 1, wherein at least one of the scope identifiers is a name of an application that is different than an application displaying the command bar, and wherein the operation of executing the particular command on the scope identifier comprises calling the application to execute the particular command using the values entered into the selectable parameter descriptors.

5. The computing device of claim 1, wherein at least one of the scope identifiers is a type of data, and wherein the operation of executing the particular command on the scope identifier comprises executing the command on data that matches the type of data using the values entered into the selectable parameter descriptors.

6. The computing device of claim 1, wherein the operations of identifying the command hierarchy comprise downloading at least a portion of the command hierarchy from a network-based service.

7. The computing device of claim 1, wherein the operations of identifying the command hierarchy comprise retrieving at least a portion of the command hierarchy from a registry of the computing device.

8. The computing device of claim 1, wherein the operations further comprise:
    receiving a command and a set of parameters corresponding to the command from a second application that is different from an application that displays the command bar;
    adding the command and the set of parameters in the hierarchy as associated with a scope identifier corresponding to the second application;
    wherein the particular scope identifier identified by the first free text user input corresponds to the second application, and wherein the second free text input matches the command received from the second application, and wherein the operations of executing the particular command on the scope identifier using values entered into the selectable parameter descriptors comprises calling the second application to execute the command and providing the values entered into the selectable parameters.

9. A computerized method of executing commands in a graphical user interface (GUI), the method comprising:
    identifying a command hierarchy, the command hierarchy including a scope identifier and a set of commands corresponding to the scope identifier;
    determining, based upon an operator, whether a text user input entered into a command bar of the GUI corresponds to a particular scope identifier of the one or more scope identifiers or a particular command of the set of one or more commands corresponding to the one or more scope identifiers;
    responsive to determining that the text user input corresponds to the particular scope identifier:
        receiving a second text user input from the command bar; and
        determining that the second free text user input matches the particular command from the set of commands corresponding to the one or more scope identifiers;
    updating a visual representation of the command bar to include selectable parameter descriptors described in the command hierarchy for the particular command; and
    responsive to receipt of commit input, executing the particular command on the scope identifier using values entered into the selectable parameter descriptors.

10. The method of claim 9, wherein the particular command is a search, and wherein the selectable parameter descriptors are search filters and wherein the particular scope identifier is a type of content to search.

11. The method of claim 10, wherein the search filters are dependent on the type of content to search.

12. The method of claim 9, wherein at least one of the scope identifiers is a name of an application that is different than an application displaying the command bar, and wherein executing the particular command on the scope identifier comprises calling the application to execute the particular command using the values entered into the selectable parameter descriptors.

13. The method of claim 9, wherein at least one of the scope identifiers is a type of data, and wherein executing the particular command on the scope identifier comprises executing the command on data that matches the type of data using the values entered into the selectable parameter descriptors.

14. The method of claim 9, wherein identifying the command hierarchy comprise downloading at least a portion of the command hierarchy from a network-based service.

15. The method of claim 9, wherein identifying the command hierarchy comprise retrieving at least a portion of the command hierarchy from a registry of the method.

16. The method of claim 9, wherein the method further comprises:
  receiving a command and a set of parameters corresponding to the command from a second application that is different from an application that displays the command bar;
  adding the command and the set of parameters in the hierarchy as associated with a scope identifier corresponding to the second application;
  wherein the particular scope identifier identified by the first free text user input corresponds to the second application, and wherein the second free text input matches the command received from the second application, and wherein the operations of executing the particular command on the scope identifier using values entered into the selectable parameter descriptors comprises calling the second application to execute the command and providing the values entered into the selectable parameters.

17. A computing device comprising:
  means for identifying a command hierarchy, the command hierarchy including a scope identifier and a set of commands corresponding to the scope identifier;
  means for determining, based upon an operator, whether a text user input entered into a command bar of the GUI corresponds to a particular scope identifier of the one or more scope identifiers or a particular command of the set of one or more commands corresponding to the one or more scope identifiers;
  responsive to determining that the text user input corresponds to the particular scope identifier:
    means for receiving a second text user input from the command bar; and
    means for determining that the second free text user input matches the particular command from the set of commands corresponding to the one or more scope identifiers;
  means for updating a visual representation of the command bar to include selectable parameter descriptors described in the command hierarchy for the particular command; and
  responsive to receipt of commit input, means for executing the particular command on the scope identifier using values entered into the selectable parameter descriptors.

18. The computing device of claim 17, wherein the particular command is a search, and wherein the selectable parameter descriptors are search filters and wherein the particular scope identifier is a type of content to search.

19. The computing device of claim 18, wherein the search filters are dependent on the type of content to search.

20. The computing device of claim 17, wherein at least one of the scope identifiers is a name of an application that is different than an application displaying the command bar, and wherein the means for executing the particular command on the scope identifier comprises means for calling the application to execute the particular command using the values entered into the selectable parameter descriptors.

* * * * *